US010286732B2

(12) United States Patent
Kanematsu

(10) Patent No.: US 10,286,732 B2
(45) Date of Patent: May 14, 2019

(54) TIRE

(71) Applicant: Sumitomo Rubber Industries, Ltd., Kobe-shi, Hyogo (JP)

(72) Inventor: Yoshiaki Kanematsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 340 days.

(21) Appl. No.: 15/241,432

(22) Filed: Aug. 19, 2016

(65) Prior Publication Data

US 2017/0050470 A1 Feb. 23, 2017

(30) Foreign Application Priority Data

Aug. 20, 2015 (JP) .................. 2015-162983

(51) Int. Cl.
*B60C 11/03* (2006.01)
*B60C 11/13* (2006.01)
*B60C 11/12* (2006.01)

(52) U.S. Cl.
CPC ...... *B60C 11/0304* (2013.01); *B60C 11/1236* (2013.01); *B60C 11/1369* (2013.01); *B60C 11/1384* (2013.01); *B60C 2011/0341* (2013.01); *B60C 2011/0353* (2013.01); *B60C 2011/0355* (2013.01); *B60C 2011/0365* (2013.01);
(Continued)

(58) Field of Classification Search
CPC . B60C 11/03; B60C 11/0304; B60C 11/0306; B60C 11/0309; B60C 11/0311; B60C 11/0316; B60C 2011/0337; B60C 2011/0341; B60C 2011/0353; B60C 2011/0355; B60C 2011/0365; B60C 2011/0367; B60C 2011/0369; B60C 2011/0374; B60C 2011/0376; B60C 2011/0379; B60C 2011/0396;
(Continued)

(56) References Cited

U.S. PATENT DOCUMENTS

2012/0145295 A1* 6/2012 Yamada ............... B60C 11/0306
152/209.22
2013/0199684 A1* 8/2013 Sakamoto ........... B60C 11/0306
152/209.18
(Continued)

FOREIGN PATENT DOCUMENTS

EP  3 000 621 A2  3/2016
JP  2013-177114 A  9/2013

*Primary Examiner* — Eric Hug
(74) *Attorney, Agent, or Firm* — Birch, Stewart, Kolasch & Birch, LLP

(57) ABSTRACT

A tire comprises a tread portion provided with a first crown main groove continuous in the tire circumferential direction, a second crown main groove continuous in the tire circumferential direction, and a center land zone defined therebetween. The center land zone is provided with first center lug grooves extending from the first crown main groove and terminating within the center land zone. Between the adjacent first center lug grooves, a first corner portion, which is formed between a ground contacting surface of the center land zone and a groove wall of the inboard first crown main groove, is provided with a first part and a second part which are arranged in the tire circumferential direction, wherein the first portion is chamfered, and the second part is not chamfered or less chamfered than the first part.

17 Claims, 10 Drawing Sheets

(52) U.S. Cl.
CPC .............. *B60C 2011/0367* (2013.01); *B60C 2011/0369* (2013.01); *B60C 2011/0372* (2013.01); *B60C 2011/0383* (2013.01); *B60C 2011/0388* (2013.01); *B60C 2011/1209* (2013.01); *B60C 2011/133* (2013.01)

(58) Field of Classification Search
CPC ............ B60C 2011/0388; B60C 11/13; B60C 11/1307; B60C 11/1384; B60C 11/1392
USPC ........................................... 152/209.8, 209.9
See application file for complete search history.

(56) References Cited

U.S. PATENT DOCUMENTS

| | | | |
|---|---|---|---|
| 2014/0014244 A1 | 1/2014 | Takano | |
| 2016/0082780 A1* | 3/2016 | Nagahara | B60C 11/042 152/209.18 |
| 2017/0008346 A1* | 1/2017 | Kubo | B60C 11/0306 |

* cited by examiner

TIRE

TECHNICAL FIELD

The present invention relates to a tire capable of achieving both of running performance on snowy roads and running performance dry roads.

BACKGROUND ART

The following Patent Literature 1 discloses a tire provided in the tread portion with main grooves extending continuously in the tire circumferential direction.
The land zones separated by the main grooves are provided with lug grooves extending from the main grooves and terminating within the respective land zones.
Such tire can exert running performance on snowy roads since the snow is compacted and sheared by the main grooves and lug grooves.
Further, the corners of the land zone between its ground contacting surface and the side walls of the adjacent main grooves are provided with chamfers extending continuously between the lug grooves adjacent in the tire circumferential direction.
Such chamfers increase the circumferential component of the edges.

SUMMARY OF THE INVENTION

Technical Problem

The tire disclosed in the Patent Literature 1 is decreased in the land ratio due to the chamfers, therefore, there is a possibility that the running performance on dry roads is deteriorated.
In view of the circumstances described above, the present invention was made. and
a primary object of the present invention is to provide a tire which can achieve both of the running performance on snowy roads and that on dry roads at high levels.

Solution to Problem

According to the present invention, a tire comprises: a tread portion provided with
a first crown main groove continuous in the tire circumferential direction,
a second crown main groove continuous in the tire circumferential direction, and
a center land zone defined therebetween,
the center land zone provided with first center lug grooves extending from the first crown main groove and terminating within the center land zone,
wherein
between the adjacent first center lug grooves, a first corner portion, which is formed between a ground contacting surface of the center land zone and a groove wall of the inboard first crown main groove, is provided with a first part and a second part which are arranged in the tire circumferential direction, wherein
the first part is chamfered, and the second part is not chamfered or less chamfered than the first part.
Further, the tire according to the present invention may have the following features (1)-(14):
(1) one end of said first part reaches to one of the adjacent first center lug grooves;
(2) one end of said second part reaches to the other inboard first center lug groove;
(3) at least one of the edges of each said inboard first center lug groove is chamfered;
(4) the center land zone is provided with second center lug grooves extending from the second crown main groove and terminating within the center land zone, and
between the adjacent outboard second center lug grooves, a second corner portion, which is formed between the ground contacting surface of the center land zone and a groove wall of the outboard second crown main groove, is provided with a first part and a second part which are arranged in the tire circumferential direction, wherein
the first part is chamfered, and the second part is not chamfered or less chamfered than the first part;
(5) the first center lug grooves and the second center lug grooves are inclined in the same direction, and arranged alternately in the tire circumferential direction;
(6) the first center lug grooves and the second center lug grooves are inclined in the same direction at 30 to 50 degrees with respect to the tire circumferential direction, and arranged alternately in the tire circumferential direction;
(7) the position of the tread portion relative to a vehicle is specified such that, when the tire is mounted on the vehicle, the first center lug grooves are located inside of the vehicle and the second center lug grooves are located outside of the vehicle, and
the axial length of the second center lug grooves is smaller than the axial length of the first center lug grooves;
(8) the first center lug groove extends in an arcuate shape, and the second center lug groove extends linearly.
(9) the tread portion is provided with
a first shoulder main groove disposed between the first crown main groove and the adjacent tread edge and extending continuously in the tire circumferential direction, and
a middle land zone defined between the first shoulder main groove and the first crown main groove,
the inboard first middle land zone is provided with
first middle lateral grooves extending from the first crown main groove to the first shoulder main groove, and
the first middle lateral grooves are continuous to the first center lug grooves through the first crown main groove;
(10) the tread portion is provided with
a first shoulder land zone defined between the first shoulder main groove and the adjacent tread edge,
the first shoulder land zone is provided with
first shoulder lateral grooves extending from the first shoulder main groove to the tread edge, and
the first middle lateral grooves are continuous to the first shoulder lateral grooves through the first shoulder main groove;
(11) the first crown main groove, the first shoulder main grooves, the first middle land zone, the first shoulder land zone, the first center lug grooves, the first middle lateral grooves, and the first shoulder lateral grooves are located on one side of the tire equator which side is inside on the vehicle when the tire is mounted on the vehicle;
(12) the tread portion is provided with
a second shoulder main groove disposed between the second crown main groove and the adjacent tread edge and extending continuously in the tire circumferential direction, and
a second middle land zone defined between the second crown main groove and the second shoulder main groove,
the center land zone is provided with
second center lug grooves extending from the second crown main groove and terminating within the center land zone, the second middle land zone is provided with first middle lug grooves extending from the second crown main groove toward the second shoulder main groove and terminating within the second middle land zone, the second center lug grooves are continuous to the first middle lug groove through the second crown main groove;

(13) the second middle land zone is provided with second middle lug grooves extending from the second shoulder main groove toward the second crown main groove and terminating within the outboard second middle land zone, and middle sipes extending between the first middle lug grooves and the second middle lug grooves.

(14) the second crown main groove, the second shoulder main grooves, the second middle land zone, the shoulder land zone, the second center lug grooves, the first middle lug grooves, the second middle lug grooves, the middle sipes are located on one side of the tire equator which side is outside of the vehicle when the tire is mounted on the vehicle.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list.

For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges 2t are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF EMBODIMENTS

The present invention can be applied to various tire structures, but suitably applied to a tire for passenger cars. Therefore, taking a passenger car radial tire as example, embodiments of the present invention will now be described in detail in conjunction with accompanying drawings.

As well known in the art, a radial tire comprises a tread portion 2, a pair of axially spaced bead portions each with a bead core therein, a pair of sidewall portions extending between the tread edges and the bead portions, a radial ply carcass extending between the bead portions, and a tread reinforcing belt disposed radially outside the carcass in the tread portion.

Figure 1:
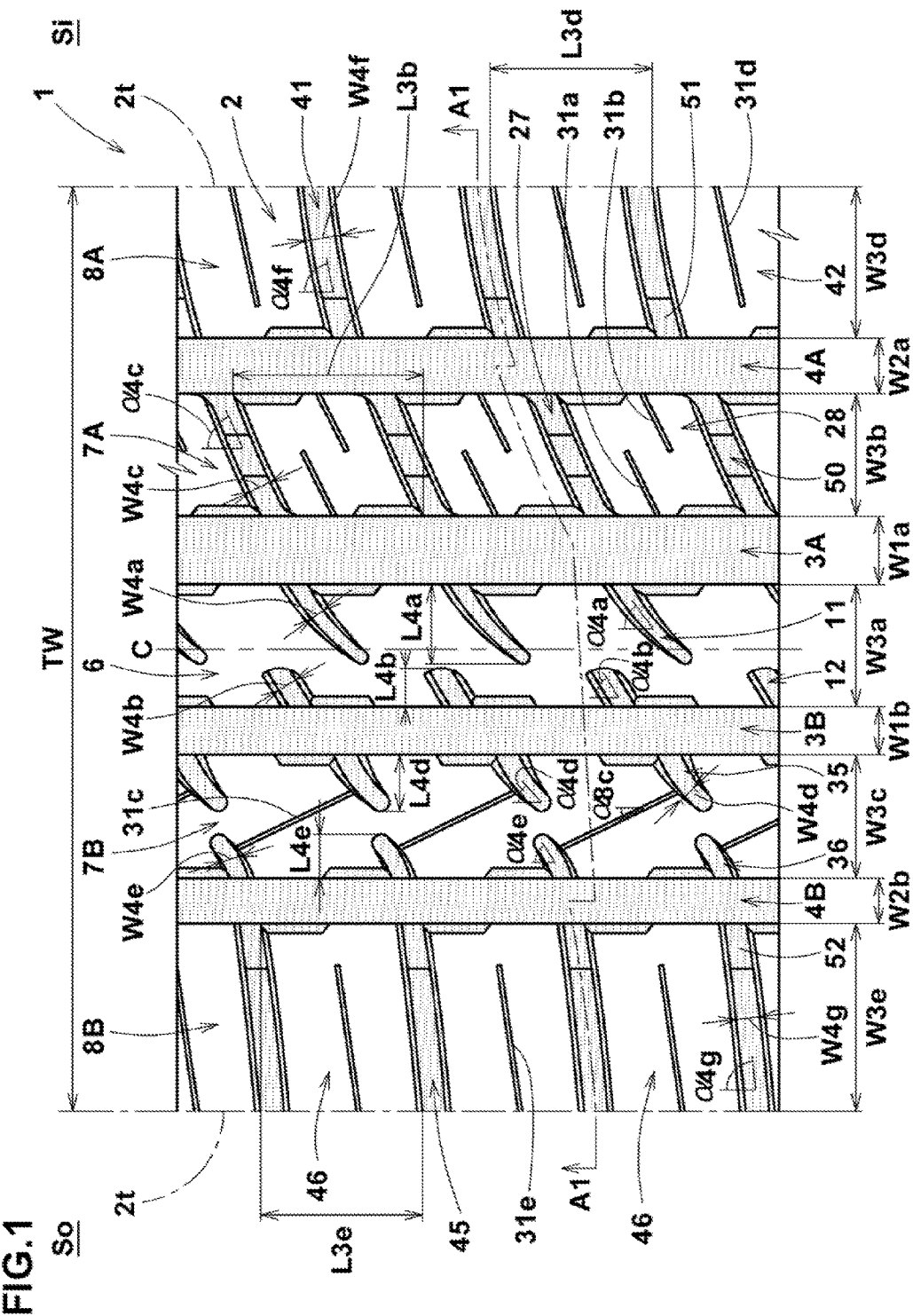
FIG. 1 is a developed view of a tread portion of a tire as an embodiment of the present invention.

FIG. 1 shows the tread portion 2 of an embodiment of the present invention.

In this embodiment, the tread portion 2 is provided with a tread pattern of left-right asymmetry (asymmetry about the tire equator). Accordingly, the mounting position of the tire 1 in relation to a vehicle (which side is inside and which side is outside) is specified.

For example, the sidewall portion to be located on outside when installed on the vehicle is provided with an indication meaning "outside", and the sidewall portion to be located on inside is provided with an indication meaning "inside".

Thus, the tread portion 2 has an outboard tread edge to be positioned away from the center of the vehicle body and an inboard tread edge to be positioned close to the center of the vehicle body.

In this application, the terms "outboard" and "inboard" are used, as appropriate, toward the outboard tread edge and inboard tread edge, respectively, to refer relative positions in the tire axial direction.

On the other hand, the terms "axially inner", "axially inward" and the like are used toward the tire equator, and the terms "axially outer", "axially outward" and the like are used toward the tread edge in order to refer relative positions in the tire axial direction.

In the drawings, "so" denotes the outside of the vehicle, and "Si" denotes the inside of the vehicle.

The tread portion 2 is provided with circumferentially continuously extending main grooves.

The main grooves in this embodiment are a pair of inboard first crown main groove 3A and outboard second crown main groove 3B, and a pair of inboard first shoulder main groove 4A and outboard second shoulder main groove 4B which are disposed axially outside the crown main grooves 3A and 3B respectively.

Accordingly, the tread portion 2 is axially divided into a center land zone 6 between the main grooves 3A and 3B, an inboard first middle land zone 7A between the main grooves 3A and 4A, an outboard second middle land zone 7B between the main grooves 3B and 4B, an inboard first shoulder land zone 8A between the main groove 4A and the inboard tread edge 2t, and an outboard second shoulder land zone 8B between the main groove 4B and the outboard tread edge 2t.

The main grooves 3A and 4A and land zones 7A and 8A are disposed on the inboard tread edge side of the tire equator c, and the main grooves 3B and 4B and land zones 7B and 8B are disposed on the outboard tread edge side of the tire equator c.

Each of the crown main grooves 3A and 3B is a straight groove. Such crown main grooves 3A and 3B compact snow, and the snow compacted in the grooves can generate a shearing force to improve the running performance on snow-covered roads. On the other hand, the crown main grooves 3A and 3B guide water in the tire circumferential direction to improve the wet performance.

The groove widths W1a and W1b of the crown main grooves 3A and 3B, respectively, are set in a range of from about 3% to 8% of the tread width TW.

The groove depths D1a and D1b of the crown main grooves 3A and 3B, respectively, are set in a range of from about 3% to 7% of the tread width TW.

In this embodiment, the groove width W1b of the outboard second crown main groove 3B is smaller than the groove width W1a of the inboard first crown main groove 3A.

Preferably, the groove width W1b is set in a range of from 60% to about 80% of the groove width W1a.

As a result, the outboard second crown main groove 3B can prevent a decrease in the ground contacting area of the tread portion 2 in an outboard side where a large load acts during cornering. As a result, the outboard second crown main groove 3B can relatively increase the rigidity of the tread portion 2 in an outboard side, and can exert the running performance on dry roads.

Each of the first and second shoulder main grooves 4A and 4B is a straight groove.

Such first shoulder main groove 4A and second shoulder main groove 4B can exert the running performance on snowy roads and wet performance.

The groove widths W2a and W2b of the shoulder main grooves 4A and 4B, respectively, are set in a range of from about 3% to 8% of the tread width TW.

The groove depths D2a and D2b of the shoulder main grooves 4A and 4B, respectively, are set in a range of from about 3% to 7% of the tread width Tw.

In this embodiment, the groove width W2b of the outboard second shoulder main groove 4B is smaller than the groove width W2a of the inboard first shoulder main groove 4A.

Preferably, the groove width W2b is set in a range of from 65% to about 85% of the groove width W2a.

Thus, the outboard second shoulder main groove 4B can prevent a decrease in the ground contact area of the tread portion in an outboard side where a large load acts during cornering, and can exert the running performance on dry roads.

The center land zone 6 is formed as a circumferentially continuous rib, which means that, excepting sipes or cuts, the center land zone 6 is provided with no grooves extending across the entire width thereof.

Preferably, the maximum width W3a of the center land zone 6 is set in a range of from about 10% to 16% of the tread width TW.

Such center land zone 6 can be increased in the rigidity in the tire circumferential direction and the rigidity in the tire axial direction as compared with a row of blocks divided by lateral grooves (not shown).

Accordingly, the tire 1 can be improved in the running performance on dry roads.

Figure 3:
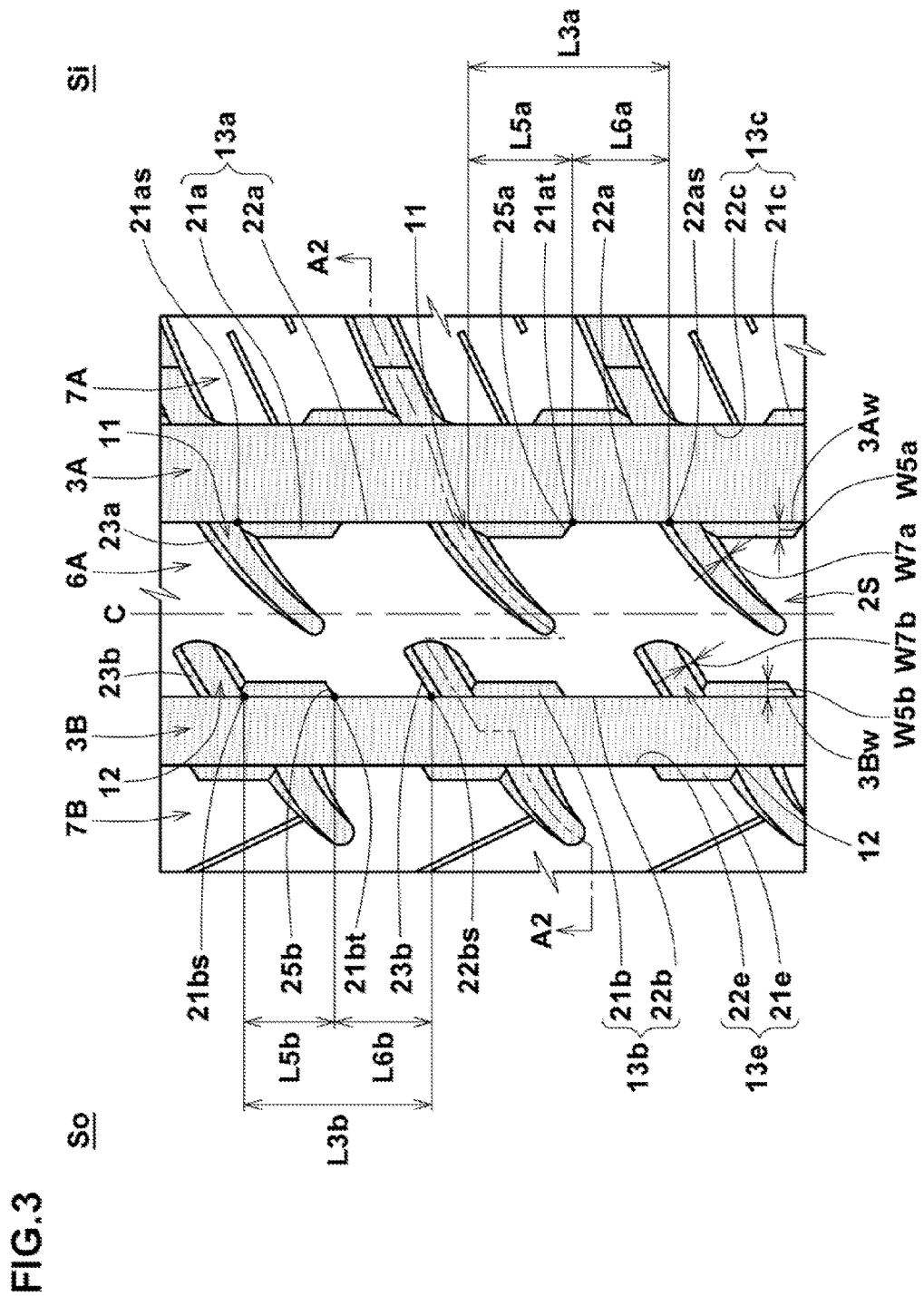
FIG. 3 is an enlarged partial top view of the center land zone shown in FIG. 1.

In this embodiment, as shown in FIGS. 1 and 3, the center land zone 6 is provided with inboard first center lug grooves 11 extending from the inboard first crown main groove 3A and terminating within the center land zone 6, and outboard second center lug grooves 12 extending from the outboard second crown main groove 3B and terminating within the center land zone 6.

Such inboard first center lug grooves 11 and outboard second center lug grooves 12 can form compacted snow, while maintaining the rigidity of the center land zone 6, therefore, it is possible to achieve both of the running performance on the snowy roads and the running performance on dry roads.

Further, the inboard first center lug grooves 11 and outboard second center lug grooves 12 can guide the water on the road surface toward the inboard first crown main groove 3A and outboard second crown main groove 3B, therefore the wet performance can be improved.

Preferably, the groove width (maximum width) W4a of the inboard first center lug grooves 11 and the groove width (maximum width) W4b of the outboard second center lug grooves 12 are set in a range of from about 3% to 5% of the tread width TW.

Preferably, the groove depth (maximum depth) D4a of the inboard first center lug grooves 11 and the groove depth (maximum depth) D4b of the outboard second center lug grooves 12 are set in a range of from about 3% to 5% of the tread width.

As shown in FIG. 1, the inboard first center lug grooves 11 and the outboard second center lug grooves 12 are arranged alternately in the tire circumferential direction.

Thus, in the center land zone 6, the inboard first center lug grooves 11 and outboard second center lug grooves 12 are distributed evenly in the tire circumferential direction, therefore, it is possible to effectively remove the water on the road surface, while preventing a decrease in the rigidity of the center land zone 6.

The inboard first center lug grooves 11 and the outboard second center lug grooves 12 are inclined with respect to the tire circumferential direction.

Such inboard first center lug grooves 11 and outboard second center lug grooves 12 can provide both of an edge component in the tire axial direction and an edge component in the tire circumferential direction in a good balance, while increasing the circumferential rigidity of the center land zone 6, therefore, the running performance on snowy roads can be improved.

The inboard first center lug grooves 11 extend across the tire equator C.

Such inboard first center lug grooves 11 can discharge the water on the road surface over a wide range in the tire axial direction of the center land zone 6, therefore, the wet performance can be improved.

The inboard first center lug grooves 11 and the outboard second center lug grooves 12 are inclined in the same direction. Thus, the inboard first center lug grooves 11 and outboard second center lug grooves 12 can even the rigidity of the center land zone 6 in the tire circumferential direction, therefore, the running performance on dry roads can be improved.

Preferably, the inclination angle α4a of the inboard first center lug grooves 11 and the inclination angle α4b the outboard second center lug grooves 12 with respect to the tire circumferential direction are set in a range of from 30 to 50 degrees.

If the angles α4a and α4b are less than 30 degrees, a sufficient edge component in the tire axial direction can not be obtained.

If the angles α4a and α4b are more than 50 degrees, a sufficient edge component in the tire circumferential direction can not be obtained.

The inclination angle α4a of the inboard first center lug grooves 11 are gradually decreased from the inboard first crown main groove 3A toward the outboard tread edge.

Thus, the inboard first center lug groove 11 extends from the inboard first crown main groove 3A toward the outboard tread edge in an arc shape.

Such inboard first center lug grooves 11 can smoothen the rigidity change in an inboard side of the center land zone 6, and it is possible to improve transient characteristics at the time of cornering on dry roads.

The inclination angle α4b of the outboard second center lug grooves 12 is constant from the outboard second crown main groove 3B toward the inboard tread edge.

Thus, the outboard second center lug groove 12 extends straight from the outboard second crown main groove 3B toward the inboard tread edge.

Such outboard second center lug grooves 12 can maintain the rigidity of the center land zone 6 in an outboard side where a large load acts during cornering, and it is possible to improve the running performance on dry roads.

The groove width W4a of the inboard first center lug grooves 11 is gradually decreased toward the outboard tread edge from the inboard first crown main groove 3A.

Figure 4:
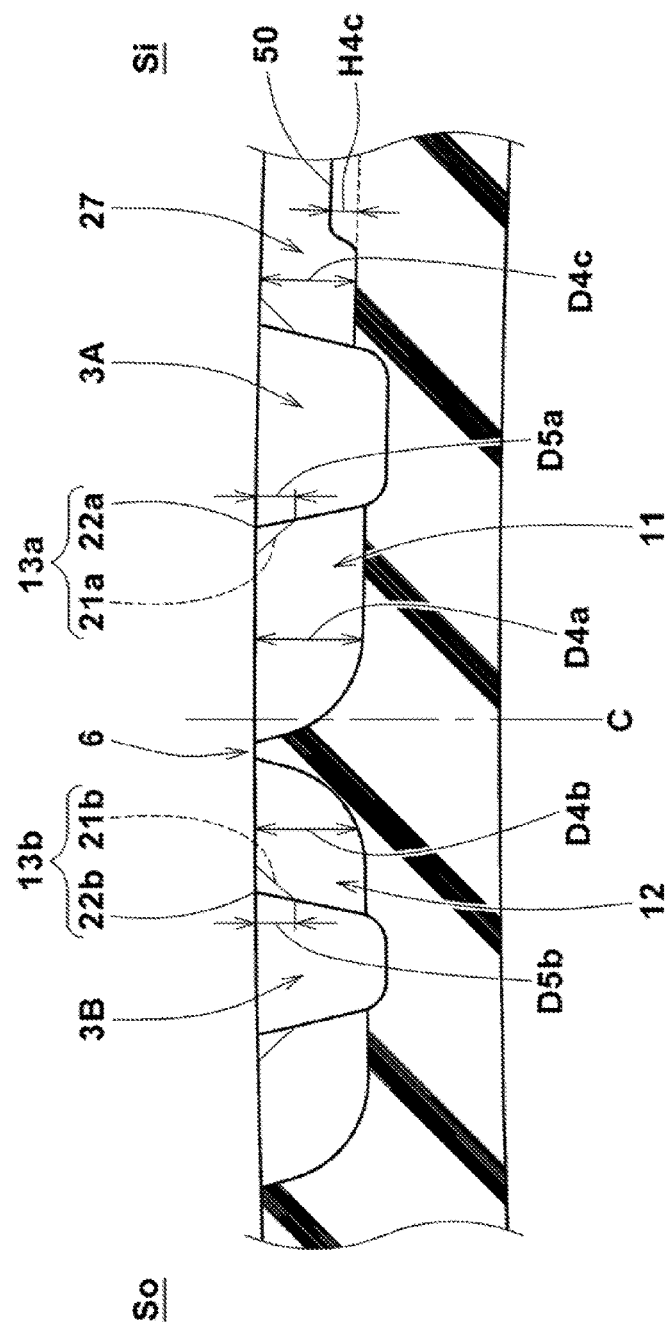
FIG. 4 is a cross sectional view taken along line A2-A2 of FIG. 3.

Further, the groove depth D4a of the inboard first center lug grooves 11 is gradually decreased toward the outboard tread edge from the inboard first crown main groove 3A as shown in FIG. 4.

Such inboard first center lug grooves 11 can prevent lowering of the rigidity of the center land zone 6, and it is possible to improve the running performance on dry roads.

Furthermore, the groove depth D4b of the outboard second center lug grooves 12 is gradually decreased toward the inboard tread edge from the outboard second crown main groove 3B.

Such outboard second center lug grooves 12 can prevent the rigidity of the center land zone 6 from decreasing.

As shown in FIG. 1, the length L4b in the tire axial direction of the outboard second center lug groove 12 is smaller than the length L4a in the tire axial direction of the inboard first center lug groove 11.

Thus, the outboard second center lug grooves 12 can make the rigidity of the center land zone 6 in an outboard side where a large load acts at the time of cornering
larger than
the rigidity of the center land zone 6 in an inboard tread edge side, and the running performance on dry roads can be improved.

In order to exert such effect effectively, the length L4b of the outboard second center lug grooves 12 is preferably set in a range of from 25% to 90% of the length L4a of the inboard first center lug grooves 11.

If the length L4b is more than 90% of the length L4a, the running performance on dry roads may not be improved.

If the length L4b is less than 25% of the length L4a, the difference between the rigidity of the center land zone 6 in its inboard side and the rigidity of the center land zone 6 in its outboard side becomes excessively large, and the running performance on dry roads may not be sufficiently improved. From such points of view, the length L4b of the outboard second center lug grooves 12 is more preferably not less than 50%, and more preferably not more than 60% of the length of L4a of the inboard first center lug grooves 11.

Figure 5:
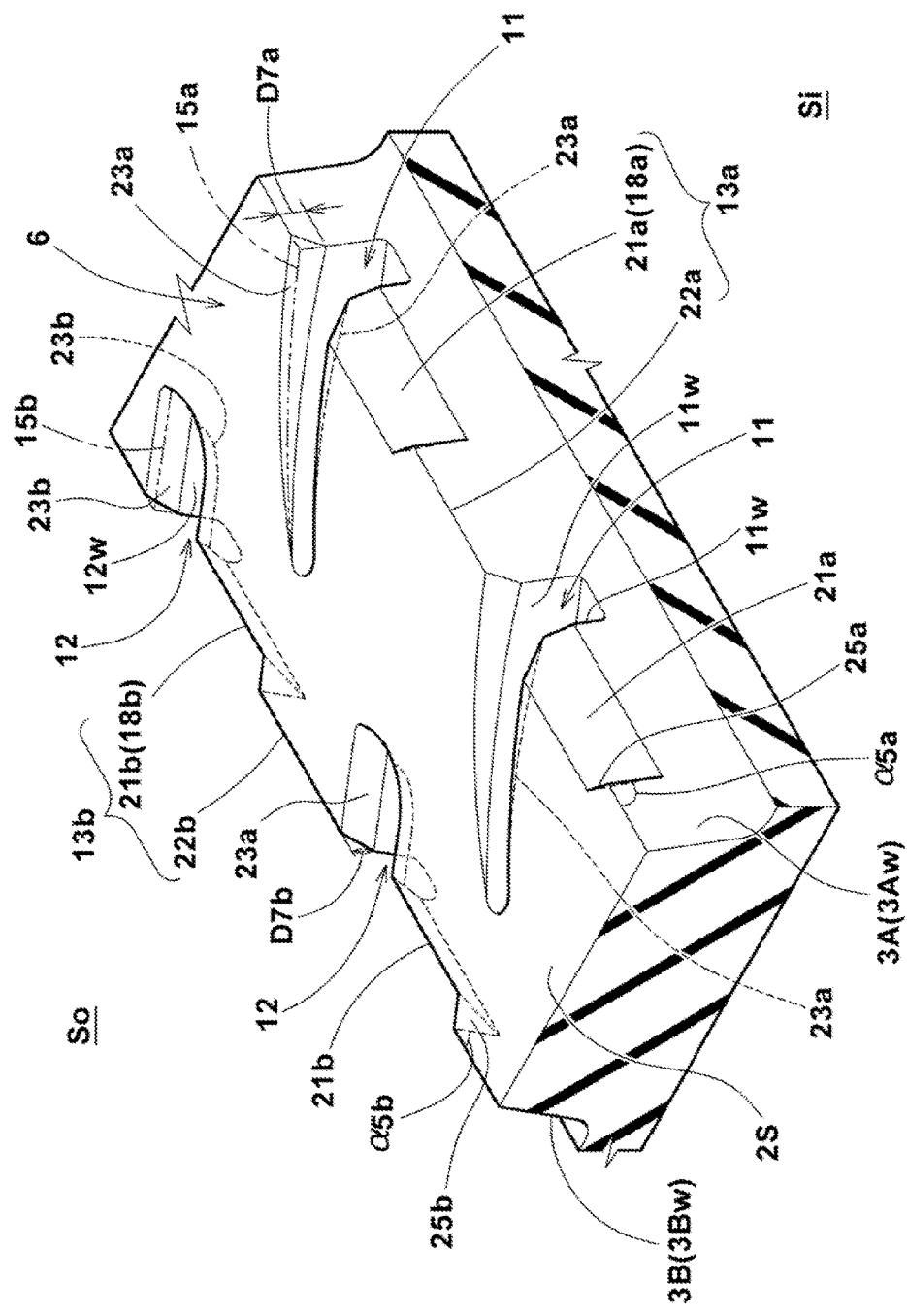
FIG. 5 is a partial perspective view of the center land zone.

In this embodiment, as shown in FIG. 5, the inboard first center lug grooves 11 are each provided with a chamfer 23a at the corner 15a between the ground contacting surface 2s of the center land zone 6 and one of, preferably each of, the opposite groove walls 11w.

Such chamfer 23a can provide an edge component to the ground contacting surface 2S of the center land zone 6 as well as to the inside of the inboard first center lug groove 11, and it is possible to improve the running performance on snowy roads.

The width W7a (shown in FIG. 3) of the chamfer 23a may be set appropriately. But, if the width W7a is small, it is impossible to form a sufficient edge component, and it may not be sufficiently improve the running performance on snowy roads. If the width W7a is large, the rigidity of the center land zone 6 becomes low, and it becomes difficult to secure the running performance on dry roads.
From this point of view, the width W7a of the chamfer 23a is preferably not less than 1.5 mm, more preferably not less than 2.0 mm, and preferably not more than 3.5 mm, more preferably not more than 3.0 mm.

Figure 2:
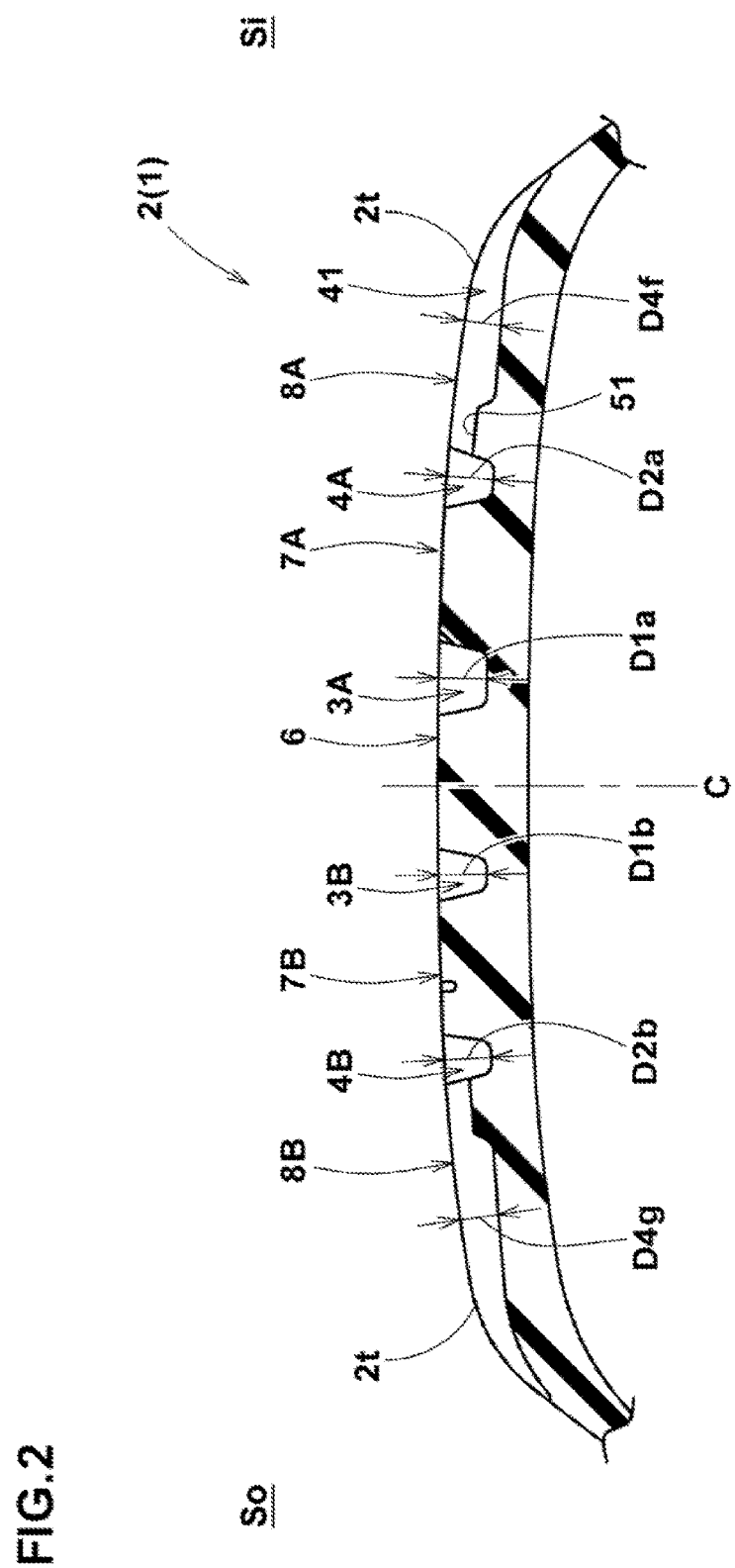
FIG. 2 is a schematic cross sectional view of the tread portion taken along line A1-A1 of FIG. 1.

The depth D7a (shown in FIG. 5) of the chamfer 23a is preferably not less than 40%, more preferably not less than 50%, and preferably not more than 70%, more preferably not more than 60% of the groove depth D1a (shown in FIG. 2) of the inboard first crown main groove 3A.

It is desirable that the width W7a and depth D7a of the chamfer 23a are gradually decreased toward the outboard tread edge from the inboard first crown main groove 3A. Such chamfer 23a can relatively increase the rigidity of the center land zone 6 from the inboard first crown main groove 3A side toward the center in the width direction of the center land zone 6, therefore, it is possible to maintain the running performance on dry roads.

In this embodiment, as shown in FIG. 5, the outboard second center lug grooves 12 are each provided with a chamfer 23b at the corner 15b between the ground contacting surface 2s of the center land zone 6 and one of, preferably each of, the opposite groove walls 12w.

The chamfers 23b can improve the running performance on snowy roads similarly to the chamfers 23a of the inboard first center lug grooves 11.

The width W7b (shown in FIG. 3) and the depth D7b (shown in FIG. 5) of the chamfer 23b can be set as appropriate. But, the width W7b is preferably not less than 1.5 mm, more preferably not less than 2.0 mm, and preferably not more than 3.5 mm, more preferably not more than 3.0 mm, and the depth D7b is preferably not less than 40%, more preferably not less than 50%, and preferably not more than 70%, more preferably not more than 60% of the groove depth D1a (shown in FIG. 2) of the inboard first crown main groove 3A.

It is preferable that the width W7b and the depth D7b of the chamfer 23b are constant from the outboard second crown main groove 3B toward the inboard tread edge.

Such chamfers 23b can provide a large edge component to an outboard side so of the center land zone 6 where a large load acts at the time of cornering, therefore, and it is possible to effectively improve the running performance on snowy roads.

As shown in FIGS. 3 and 5, a first corner portion 13a, which is formed between the ground contacting surface 2s of the center land zone 6 and the groove wall 3Aw of the inboard first crown main groove 3A, is provided with first parts 21a chamfered and second parts 22a not chamfered. The first parts 21a and the second parts 22a are arranged alternately in the tire circumferential direction.

Between every two of the circumferentially adjacent inboard first center lug grooves 11, one first part 21a and one not-chamfered second part 22a are located.

The chamfer 18a of the first part 21a in this example is a flat surface.

Such first part 21a can provide a circumferential edge component to the ground contacting surface 2s of the center land zone 6 as well as to the inside of the inboard first crown main groove 3A, therefore, it is possible to improve the running performance on snowy roads.

Further, the first part 21a can partially decrease the ground contact area of the center land zone 6, therefore, it is possible to improve the wet performance.

On the other hand, the second part 22a which is not chamfered, can prevent the ground contact area and rigidity of the center land zone 6 from decreasing, and can exert the running performance on dry roads.

Accordingly, by the first parts 21a and the second parts 22a, the tire 1 in this embodiment can achieve both of the running performance on snowy roads and the running performance on dry roads at high levels.

The width W5a (shown in FIG. 3) of the first part 21a can be set appropriately. But, the width W5a is preferably not less than 0.8 mm, more preferably not less than 1.0 mm, and preferably not more than 2.5 mm, more preferably not more than 2.0 mm.

If the width W5a is small, it is impossible to form a sufficient edge component, and the running performance on snowy roads may not be sufficiently improved. Further, as the ground contact area of the center land zone 6 can not be decreased, the wet performance may not be sufficiently improved.

If the width W5a of the first part 21a is large, the rigidity of the center land zone 6 becomes low, and the running performance on dry roads may not be sufficiently maintained.

The depth D5a (shown in FIG. 4) of the first part 21a is preferably not less than 30%, more preferably not less than 40%, and preferably not more than 60%, more preferably not more than 50% of the groove depth D1a (shown in FIG. 2) of the inboard first crown main groove 3A.

Between every two of the circumferentially adjacent inboard first center lug grooves 11, as shown in FIG. 3, the circumferential length L5a of the first part 21a and the circumferential length L6a of the second part 22a are preferably not less than 40%, more preferably not less than 45%, and preferably not more than 60%, more preferably not more than 55% of the circumferential distance L3a between the inboard first center lug grooves 11.

One end 21as of the first part 21a reaches to one of the two adjacent inboard first center lug grooves 11.

One end 22as of the second part 22a reaches to the other of the two adjacent inboard first center lug grooves 11.

Thus, the first part 21a continues to the chamfer 23a of the above-mentioned one of the two inboard first center lug grooves 11, and can provide a substantially L-shaped edge in the top view, therefore, it is possible to improve the running performance on snowy roads.

Thereby, the center land zone 6 can maintain its rigidity in the vicinity of the other inboard first center lug groove 11, and it is possible to improve the running performance on dry roads.

Between the adjacent first part 21a and second part 22a, a first step surface 25a is formed as shown in FIGS. 3 and 5. The first step surface 25a provides an axial edge component, and it is possible to circumferentially scratch the snow on the first part 21a, therefore, the running performance on snowy roads can be improved.

In order to effectively scratch the snow, it is preferable that the first step surface 25a intersects with the ground contacting surface 2S of the center land zone 6 at an intersecting angle α5a of from 70 to 90 degrees.

In this embodiment, the first step surface 25a is triangular, and tapered toward the radially inside of the tire in order to maintain the rigidity of the center land zone 6.

As shown in FIG. 3, in the top view, the other end 21at of the first part 21a is tapered.

Such first part 21a can reduce a stepped difference in the rigidity formed between the first part 21a and the second part 22a, therefore, it is possible to prevent steering stability from deteriorating.

In the second part 22a in this embodiment, a first corner portion 13a is not chamfered. But, it is also possible to configure the second part 22a such that the first corner portion 13a is less chamfered than the first part 21a.

Such second part 22a can prevent the ground contact area and the rigidity of the center land zone 6 from decreasing, while providing a circumferential edge component to the ground contacting surface 2s as well as to the inside of the inboard first crown main groove 3A.

Accordingly, the tire 1 in this embodiment can achieve both of the running performance on snowy roads and the running performance on dry roads at high levels.

As shown in FIGS. 3 and 5, a second corner portion 13b, which is formed between the ground contacting surface 2s of the center land zone 6 and the groove wall 3Bw of the outboard second crown main groove 3B is provided with chamfered first parts 21b and not-chamfered second parts 22b which are arranged alternately in the tire circumferential direction.

Between every two of the circumferentially adjacent outboard second center lug grooves 12, one first part 21b and one not-chamfered second part 22b are located.

The chamfer 18b of the first part 21b in this example is a flat surface.

Such first part 21b can improve the wet performance, while improving the running performance on snowy roads similarly to the first part 21a on the inboard first crown main groove 3A side.

On the other hand, the second part 22b can prevent the ground contact area and rigidity of the center land zone 6 from decreasing, and it is possible to exert the running performance on dry roads.

Accordingly, by the first parts 21b and second parts 22b, the tire 1 in this embodiment can achieve both of the running performance on snowy roads and the running performance on dry roads at high levels.

Further, in this embodiment, the first parts 21a and 21b and the second part 22a and 22b are disposed on both sides of the center land zone 6, therefore, it is possible to achieve both of the running performance on snowy roads and the running performance on dry roads at further high levels.

In order to achieve both of the running performance on dry roads and that on snowy roads effectively, preferably, a width W5B, a depth D5b (shown in FIG. 4) and a circumferential length L5b (the ratio to the circumferential distance L3b between the outboard second center lug grooves 12) of the first part 21b are respectively set in the same ranges as those for the width W5a, the depth D5a (shown in FIG. 4) and the length L5a (the ratio to the distance L3a between the inboard first center lug grooves 11) of the first part 21a between the inboard first center lug grooves 11.

Preferably, the circumferential length L6b (the ratio to the distance L3b between the outboard second center lug grooves 12) of the second part 22b is set in the same range as that for the length L6a (the ratio to the distance L3a between the inboard first center lug grooves 11) of the second part 22a between the inboard first center lug grooves 11.

One end 21bs of the first part 21b reaches to one of the outboard second center lug grooves 12.

One end 22bs of the second part 22b reaches to the other outboard second center lug groove 12.

Thus, the first part 21b continues to the chamfer 23b of one of the outboard second center lug grooves 12, and can provide a substantially L-shaped edge in the top view, therefore, the running performance on snowy roads can be improved.

Accordingly, the center land zone 6 can maintain its rigidity in the vicinity of the other outboard second center lug groove 12, and it is possible to maintain the running performance on dry roads.

As shown in FIGS. 3 and 5, between the adjacent first part 21b and second part 22b, a second step surface 25b is formed.

The second step surface 25b provides an axial edge component, and it is possible to circumferentially scratch the snow on the first part 21b, therefore, the running performance on snowy roads can be improved.

The angle α5b of the second stepped surface 25b with respect to the ground contacting surface 25 of the center land zone 6 is preferably set in the same range as the angle α5a of the first step surface 25a.

Further, in the top view, the other end 21bt of the first part 21b is preferably tapered in order to alleviate the rigidity step formed between the first part 21b and the second part 22b.

The second part 22b can be chamfered less than the first part 21b similarly to the second part 22a on the inboard first crown main groove 3A side.

Such less-chamfered second parts 22b can prevent the ground contact area and the rigidity of the center land zone 6 from decreasing, while providing a circumferential edge component to the ground contacting surface 2S of the center land zone 6 and also to the inside of the outboard second crown main groove 3B.

The inboard first middle land zone 7A is provided with inboard first middle lateral grooves 27 extending from the inboard first crown main groove 3A to the inboard first shoulder main groove 4A.

By the inboard first middle lateral grooves 27, the inboard first middle land zone 7A is divided into inboard first middle blocks 28.

The inboard first middle lateral grooves 27 are inclined with respect to the tire axial direction.

Such inboard first middle lateral grooves 27 can provide both of a circumferential edge component and an axial edge component in a good balance, therefore, it is possible to improve the running performance on snowy roads.

Further, the inboard first middle lateral grooves 27 can guide the water on the road surface toward the inboard first crown main groove 3A and the inboard first shoulder main groove 4A, therefore, the wet performance can be improved.

In order to effectively derive such functions, the groove width W4c of the inboard first middle lateral grooves 27 is preferably set in a range of from about 3% to 5% of the tread width Tw.

The maximum groove depth D4c (shown in FIG. 4) of the inboard first middle lateral grooves 27 is preferably set in a range of from about 2.5% to 4.5% of the tread width TW. The angle α4c (shown in FIG. 1) of the inboard first middle lateral grooves 27 with respect to the tire circumferential direction is preferably set in a range of from 50 to 80 degrees.

The inboard first middle lateral grooves 27 are continuous with the inboard first center lug grooves 11 through the inboard first crown main groove 3A.

Such inboard first middle lateral grooves 27 and inboard first center lug grooves 11 can guide the water on the road surface from the tire equator C side toward the inboard tread edge in succession, therefore, it is possible to improve the wet performance.

The inboard first middle lateral grooves 27 are, as shown in FIG. 1, each provided therein with a first tie bar 50 raising from the groove bottom at an axial center position of the groove length.

The height H4c (shown in FIG. 4) of the first tie bar 50 is preferably set in a range of from about 20% to 40% of the groove depth D4c of the first middle lateral groove 27.

Such first tie bars 50 connect between the adjacent inboard first middle blocks 28, and increase the rigidity of the inboard first middle land zone 7A, therefore, it is possible to maintain the running performance on dry roads.

Figure 6:
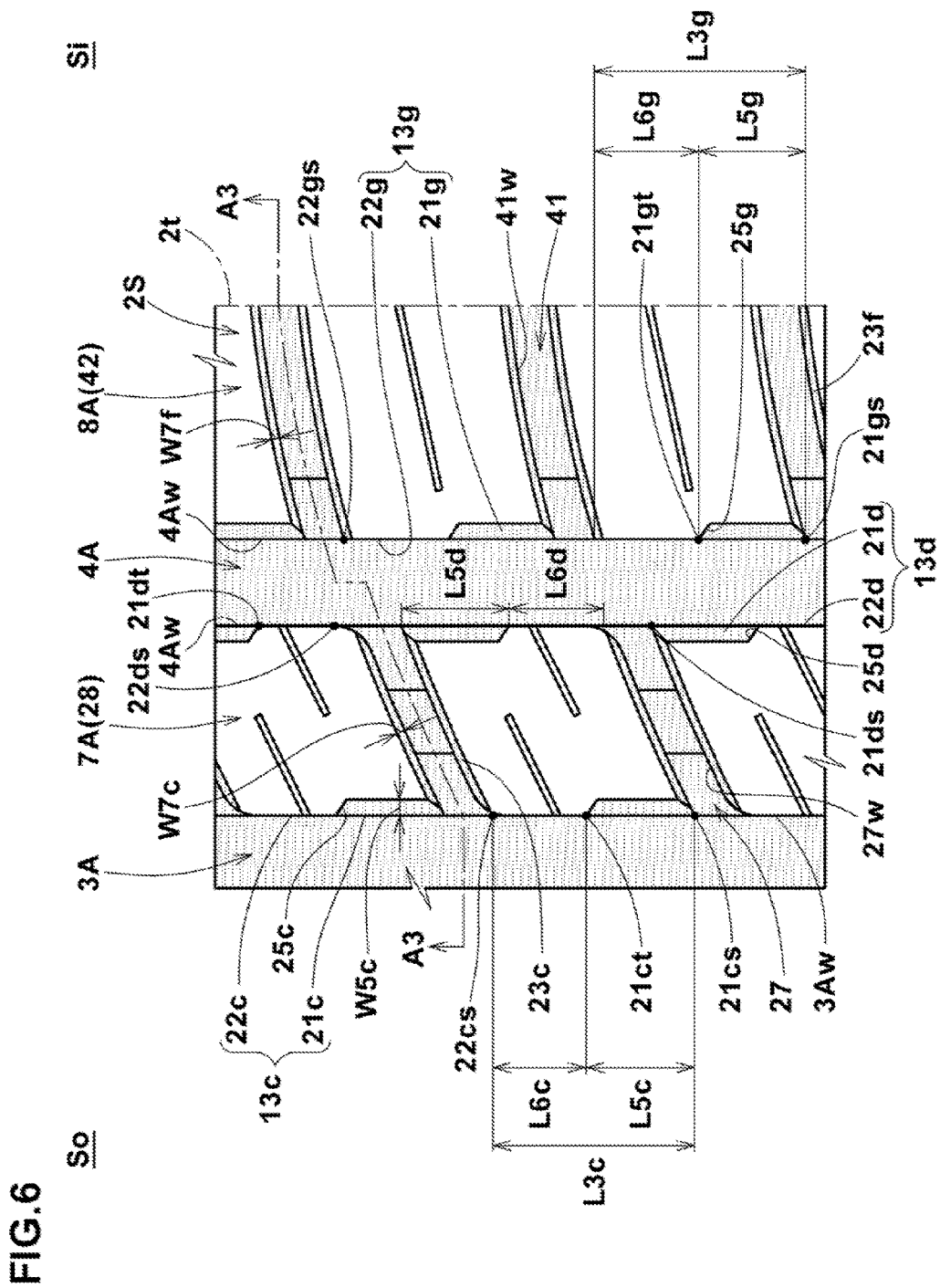
FIG. 6 is an enlarged partial top view of the inboard first middle land zone and the inboard first shoulder land zone shown in FIG. 1.

At least one of the edges (in this embodiment as shown in FIG. 6, each of the edges) of each of the inboard first middle lateral grooves 27 is chamfered. The chamfers 23c can further improve the running performance on snowy roads together with the chamfers 23a of the inboard first center lug grooves 11. In order to effectively derive such functions, it is preferable that each of the edges is chamfered or provided with the chamfers 23a.

A width W7c and a depth of the chamfer 23c may be set as appropriate, but preferably, they are set in the same ranges as those for the width W7A and the depth D7a of the chamfer 23a of the inboard first center lug grooves 11.

In each of the inboard first middle blocks 28, its maximum circumferential length L3b is larger than its maximum axial width W3b as shown in FIG. 1, and the shape of the block 28 in its top view is substantially a parallelogram.

Preferably, the maximum circumferential length L3b is set in a range of from 15% to about 20% of the tread width TW, and the maximum axial width W3b is set in a range of from 10% to about 15% of the tread width TW.

Such inboard first middle block 28 is increased in the rigidity in both of the tire circumferential direction and tire axial direction in a good balance, and it is possible to improve the running performance on snowy roads and the running performance on dry roads.

Each of the inboard first middle blocks 28 is provided with a first middle sipe 31a and a second middle sipe 31b.

The first middle sipe 31a extends from the inboard first crown main groove 3A towards the inboard tread edge and terminates within the inboard first middle block 28.

The second middle sipe 31b extends from the inboard first shoulder main groove 4A toward the outboard tread edge and terminates within the inboard first middle block 28.

The first middle sipe 31a and the second middle sipe 31b are inclined with respect to the tire axial direction.

Such first middle sipe 31a and second middle sipe 31b can provide a circumferential edge component and an axial edge component to the inboard first middle block 28, therefore, the running performance on snowy roads and the running performance on dry roads can be improved.

In order to effectively derive such functions, the width of the first middle sipe 31a and the width of the second middle sipe 31b are preferably set in a range of from 0.6 to 1.0 mm, and the depth of the first middle sipe 31a and the depth of the second middle sipe 31b are preferably set in a range of from 2.0 to 3.0 mm.

Preferably, the first middle sipe 31a and the second middle sipe 31b are inclined parallel with the inboard first middle lateral grooves 27.

Thus, the rigidity of the inboard first middle block 28 is evened in the tire circumferential direction, and the first middle sipe 31a and the second middle sipe 31b can improve the running performance on dry roads.

Figure 7:
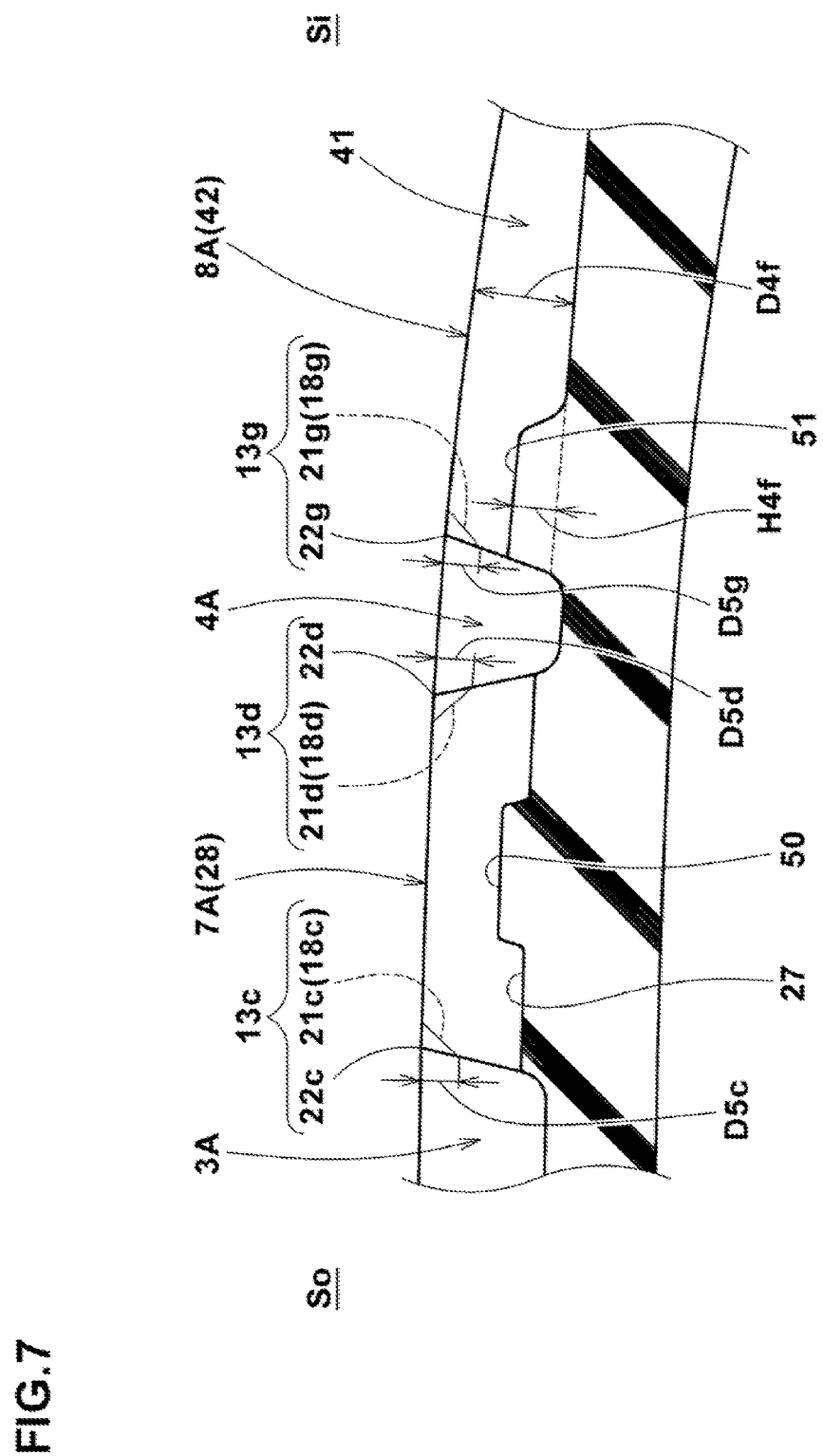
FIG. 7 is a cross sectional view taken along line A3-A3 of FIG. 6.

In each of the inboard first middle blocks 28, as shown in FIGS. 6 and 7, a third corner portion 13c, which is formed between the ground contacting surfaces 2s of the inboard first middle block 28 and the axially outer groove wall 3Aw of the inboard first crown main groove 3A, is provided with a chamfered first part 21c and a not-chamfered second part 22c which are arranged in the tire circumferential direction. The chamfer 18c of the chamfered first part 21c in this example is a flat surface.

Such first part 21c provides a circumferential edge component to the ground contacting surface 2s of the inboard first middle block 28 and to the inside of the inboard first crown main groove 3A, therefore, it is possible to improve the running performance on snowy roads. Further, the first part 21c can partially decrease3 the ground contact area of the inboard first middle block 28, therefore, it is possible to improve the wet performance.

On the other hand, the second part 22c which is not chamfered, can prevent the ground contacting area and the rigidity of the inboard first middle block 28 from decreasing, and thereby can exert the running performance on dry roads. Accordingly, by the first part 21c and the second part 22c, the tire 1 in this embodiment can achieve both of the running performance on snowy roads and the running performance on dry roads at high levels.

It is preferable that the a width W5c, a depth D5c (shown in FIG. 7) and a circumferential length L5c (circumferential distance L3c between the inboard first middle lateral grooves 27) of the chamfered first part 21c are respectively set in the same ranges as those for the width W5a and the depth D5a (shown in FIG. 4) and the length L5a (the ratio to the distance L3a between the inboard first center lug grooves 11) of the first part 21a between the inboard first center lug grooves 11 shown in FIG. 3.

It is preferable that the circumferential length L6c (the ratio to the distance L3c between the inboard first middle lateral grooves 27) of the second part 22c is set in the same range as that for the length L6a (the ratio of the distance L3a between the inboard first center lug grooves 11) of the second part 22a between the inboard first center lug grooves 11 shown in FIG. 3.

One end 21cs of the first part 21c reaches to one of the adjacent inboard first middle lateral grooves 27.

One end 22cs of the second part 22c reaches to the other inboard first middle lateral groove 27.

The first part 21c continues to the chamfer 23c of one of the inboard first middle lateral grooves 27, and provides a substantially L-shaped edge in the top view, thereby the running performance on snowy roads can be improved.

The inboard first middle block 28 can maintain its rigidity in the vicinity of the other first middle lateral groove 27, thereby, it is possible to maintain the running performance on dry roads.

It is preferable that, along the inboard first crown main groove 3A, the chamfered first parts 21c and the chamfered first parts 21a are arranged alternately or staggeredly as shown in FIG. 3. And, the second part 22c and the second part 22a are arranged alternately or staggeredly along the inboard first crown main groove 3A.

Thus, on both sides of the inboard first crown main groove 3A, the first parts 21a and 21c are disposed evenly in the tire circumferential direction, and the running performance on snowy roads and the wet performance can be effectively improved. Further, on both sides of the inboard first crown main groove 3A, the second parts 22a and 22c are disposed evenly in the tire circumferential direction, which can effectively exert the running performance on dry roads.

As shown in FIG. 6, between the adjacent first part 21c and second part 22c, a third stepped surface 25c is formed. Preferably, the inclination angle (not shown) of the third step face 25c with respect to the ground contacting surface 2s of the inboard first middle block 28 is set in the same range as that for the angle α5a (shown in FIG. 5) of the first step surface 25a.

Such third step face 25c can scratch, in the tire circumferential direction, the snow on the first part 21c similarly to the first step surface 25a shown in FIG. 5, while providing an axial edge component, and it can exert the running performance on snowy roads.

Preferably, the other end 21ct of the chamfered first part 21c is tapered in the top view of the block as shown in FIG. 6 in order to avoid a stepped difference in the rigidity formed between the chamfered first part 21c and the second part 22c.

The second part 22c can be chamfered less than the first part 21c similarly to the second part 22a between the inboard first center lug grooves 11.

Such less-chamfered second part 22c can prevent the ground contact area and the rigidity of the inboard first middle block 28 from decreasing, while providing a circumferential edge component to the ground contacting surface 2s of the inboard first middle block 28 and to the inside of the inboard first crown main groove 3A.

In each of the inboard first middle blocks 28, as shown in FIGS. 6 and 7, a fourth corner 13d, which is formed between the ground contacting surface 2s of the inboard first middle block 28 and the axially inner groove wall 4Aw of the inboard first shoulder main groove 4A, is provided with a chamfered first part 21d and a not-chamfered second part 22d which are arranged in the tire circumferential direction. The chamfer 18b of the first part 21d in this example is a flat surface.

Such first part 21d can improve the wet performance, while improving the running performance on snowy roads similarly to the first part 21c on the inboard first crown main groove 3A side.

On the other hand, the second part 22d which is not chamfered, can prevent the ground contact area and the rigidity of the inboard first middle block 28 from decreasing similar to the second part 22c on the inboard first crown main groove 3A side, thereby it can exert the running performance on dry roads. Accordingly, by the first part 21d and the second part 22d, the tire 1 in this embodiment can achieve both of the running performance on snowy roads and the running performance on dry roads at high levels.

Further, in this embodiment, as the first parts 21c and 21d and the second parts 22c and 22d are disposed on both sides in the tire axial direction of the inboard first middle blocks 28, the running performance on snowy roads and the running performance on dry roads can be achieved at further high levels.

Preferably, a width W5d, a depth D5d (shown in FIG. 7) and a circumferential length L5d (the ratio to the distance L3c between the inboard first middle lateral grooves 27) of the first part 21d are respectively set in the same ranges as those for the width W5a, the depth D5a (shown in FIG. 4) and the length L5a (the distance L3a between the inboard first center lug grooves 11) of the first part 21a between the inboard first center lug grooves 11 shown in FIG. 3.

Preferably, a circumferential length L6d (the ratio to the distance L3c between the inboard first middle lateral grooves 27) of the second part 22d is set in the same range as that for the length L6a (the ratio to the distance L3a between the inboard first center lug grooves 11) of the second part 22a between the inboard first center lug grooves 11 shown in FIG. 3.

One end 21ds of the first part 21d reaches to one of the adjacent inboard first middle lateral grooves 27.

One end 22ds of the second part 22d reaches to the other inboard first middle lateral groove 27.

Thus, the first part 21d continues to the chamfer 23c of one of the inboard first middle lateral grooves 27, and provides a substantially L-shaped edge in the top view, thereby, the running performance on snowy roads can be improved.

The inboard first middle block 28 can maintain its rigidity in the vicinity of the other first middle lateral groove 27, and it is possible to maintain the running performance on dry roads.

In each of the inboard first middle blocks 28, it is preferable that the chamfered first part 21c and the chamfered first part 21d are not overlapped with each other in the tire circumferential direction as shown in FIG. 6.

Thus, on both sides in the tire axial direction of the inboard first middle blocks 28, the first parts 21c and 21d are disposed evenly in the tire circumferential direction, therefore, it is possible to effectively improve the running performance on snowy roads and the wet performance, while maintaining the rigidity of the inboard first middle blocks 28.

Between the adjacent first part 21d and second part 22d, a fourth step surface 25d is formed.

Preferably, the inclination angle (not shown) of the fourth step surface 25d with respect to the ground contacting surface 2s of the inboard first middle block 28 is set in the same range as that for the angle α5a (shown in FIG. 5) of the first step surface 25a.

Such fourth step surface 25d can provide an axial edge component similarly to the first step surface 25a shown in FIG. 5, and can scratch, in the tire circumferential direction, the snow on the first part 21d, therefore, it can exert the running performance on snowy roads.

Preferably, the other end 21dt of the first part 21d is tapered in the top view in order to avoid a stepped difference in the rigidity formed between the first part 21d and the second part 22d.

The second part 22d can be chamfered less than the first part 21d similarly to the second part 22a between the inboard first center lug grooves 11.

Such less-chamfered second part 22d can prevent the ground contact area and the rigidity of the inboard first middle block 28 from decreasing, while providing a circumferential edge component to the ground contacting surface 2s of the inboard first middle block 28 as well as to the inside of the inboard first shoulder main groove 4A.

The outboard second middle land zone 7B is formed as a rib extending substantially continuously in the tire circumferential direction as shown in FIG. 1.

Preferably, the maximum axial width W3c of the outboard second middle land zone 7B is set in a range of from 10% to about 15% of the tread width TW.

The outboard second middle land zone 7B is subjected to a large load during cornering as compared to the inboard first middle land zone 7A, therefore, by configuring the outboard second middle land zone 7B as a rib having higher rigidity, the running performance on dry roads can be improved.

The outboard second middle land zone 7B is provided with axially inner first middle lug grooves 35 and axially outer second middle lug grooves 36.

The first middle lug grooves 35 extend from the outboard second crown main groove 3B toward the outboard second shoulder main groove 4B and terminate within the outboard second middle land zone 7B.

The second middle lug grooves 36 extend from the outboard second shoulder main groove 4B toward the outboard second crown main groove 3A and terminate within the outboard second middle land zone 7B.

Such first middle lug groove 35 and second middle lug groove 36 can form compressed snow therein, while maintaining the rigidity of the outboard second middle land zone 7B, therefore, it is possible to achieve both of the running performance on snowy roads and the running performance on dry roads.

Further, the first middle lug grooves 35 and the second middle lug grooves 36 can guide the water on the road surface toward the outboard second crown main groove 3B and toward the outboard second shoulder main groove 4B, and can improve the wet performance.

In this embodiment, the first middle lug grooves 35 are continuous with the respective outboard second center lug grooves 12 through the outboard second crown main groove 3B. Such outboard second center lug grooves 12 and first middle lug grooves 35 can smoothly guide the water on the road surface from the center land zone 6 toward the outboard second middle land zone 7B, therefore, the wet performance can be improved.

It is preferable that the groove width (maximum width) W4d of the first middle lug groove 35 and the groove width (maximum width) W4e of the second middle lug groove 36 are set in the same ranges as that for the groove width (maximum width) W4a of the inboard first center lug groove 11 and the groove width (maximum width) W4b of the outboard second center lug groove 12.

It is preferable that the groove depth D4d (shown in FIG. 9) of the first middle lug grooves 35 and the groove depth D4e of the second middle lug grooves 36 are set in the same range as that for the groove depth D4a (shown in FIG. 4) of the inboard first center lug groove 11 and the groove depth D4$b$ of the outboard second center lug groove 12.

The axially inner first middle lug grooves 35 and the axially outer second middle lug grooves 36 are arranged alternately in the tire circumferential direction as shown in FIG. 1.

Thus, as the first middle lug grooves 35 and the second middle lug grooves 36 are arranged evenly in the tire circumferential direction, the water on the road surface can be effectively removed, while preventing the rigidity of the outboard second middle land zone 7B from decreasing.

The first middle lug grooves 35 and the second middle lug grooves 36 in this embodiment are inclined with respect to the tire circumferential direction.

Such first middle lug groove 35 and second middle lug groove 36 can provide an axial edge component and a circumferential edge component in a good balance, and it is possible to improve the running performance on snowy roads.

Preferably, the angle $\alpha 4d$ of the axially inner first middle lug grooves 35 with respect to the tire circumferential direction and the angle $\alpha 4e$ of the axially outer second middle lug grooves 36 with respect to the tire circumferential direction are set in the same range as that for the angle $\alpha 4a$ of the inboard first center lug grooves 11 and the angle $\alpha 4b$ of the outboard second center lug grooves 12.

The first middle lug grooves 35 and the second middle lug grooves 36 in this embodiment are inclined in the same direction.

Thus, the first middle lug grooves 35 and the second middle lug grooves 36 can uniform, in the tire circumferential direction, the rigidity of the outboard second middle land zone 7B, and it is possible to improve the running performance on dry roads.

The angle $\alpha 4d$ of the first middle lug grooves 35 with respect to the tire circumferential direction is gradually decreased from the outboard second crown main groove 3B toward the outboard tread edge.

The angle $\alpha 4e$ of the second middle lug groove 36 with respect to the tire circumferential direction is gradually decreased from the outboard second shoulder main groove 4B toward the inboard tread edge.

Such first middle lug grooves 35 and second middle lug grooves 36 can smoothen a change in the rigidity of the outboard second middle land zone 7B, and it is possible to improve the transient characteristics at the time of cornering on a dry roads.

The groove width W4$d$ of the axially inner first middle lug groove 35 is gradually decreased from the outboard second crown main groove 3B toward the outboard tread edge.

The groove width W4$e$ of the axially outer second middle lug groove 36 is gradually decreased from the outboard second shoulder main groove 4B toward the inboard tread edge.

Such first middle lug grooves 35 and second middle lug grooves 36 can prevent the rigidity of the outboard second middle land zone 7B from decreasing, and it is possible to improve the running performance on dry roads.

The axial length L4$e$ of the axially outer second middle lug groove 36 is smaller than the axial length L4$d$ of the axially inner first middle lug groove 35.

Such first middle lug groove 35 and second middle lug groove 36 can make
the rigidity of the outboard second middle land zone 7B on its outboard tread edge side where a large load acts during cornering
higher than
the rigidity of the outboard second middle land zone 7B on its inboard tread edge side.

Accordingly, the first middle lug groove 35 and the second middle lug grooves 36 can improve the running performance on dry roads.

In order to exert such effect effectively, the axial length L4$e$ of the axially outer second middle lug groove 36 is preferably set in a range of from 60% to 80% of the axial length L4$d$ of the axially inner first middle lug groove 35.

Figure 8:
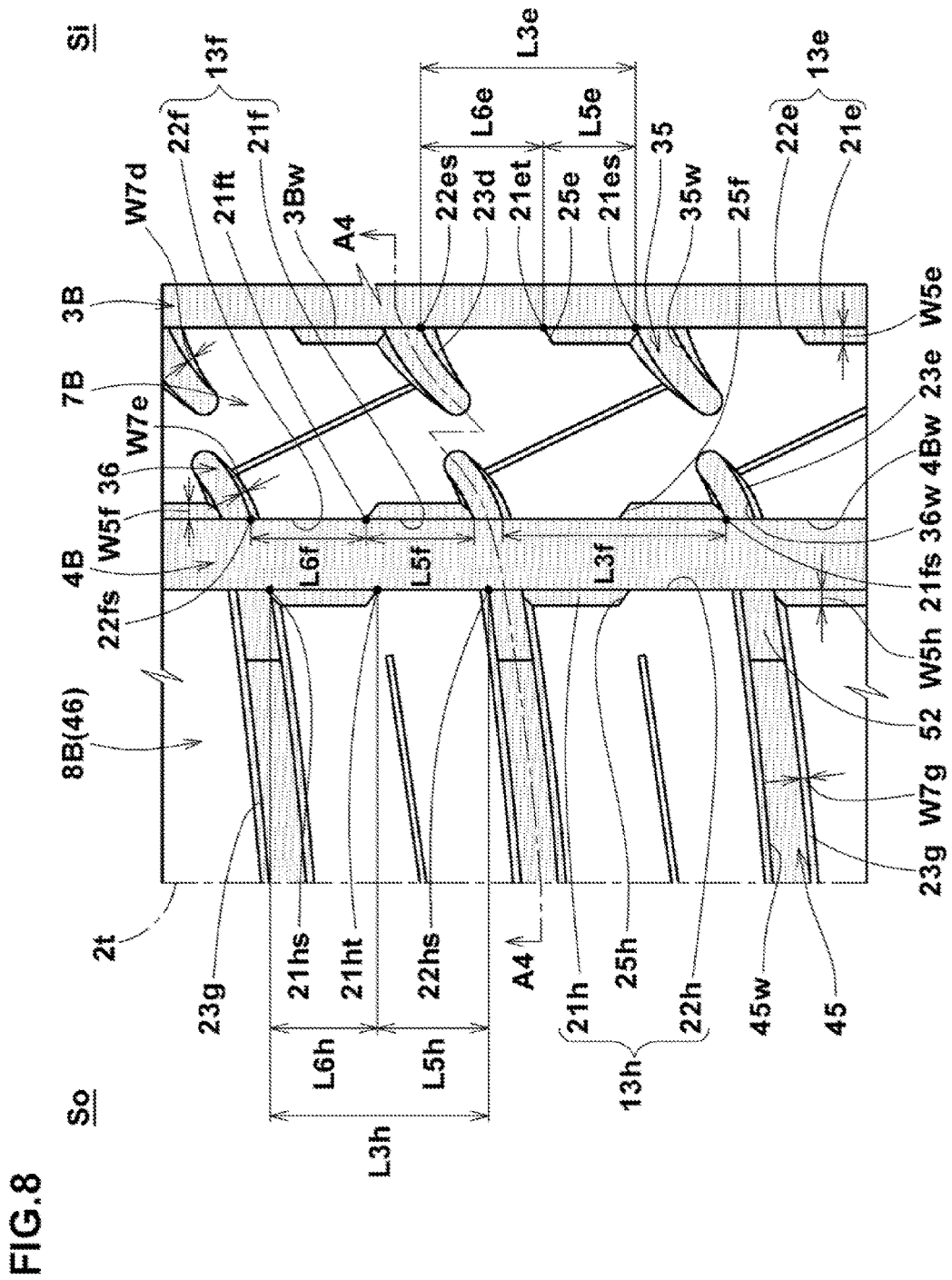
FIG. 8 is an enlarged partial top view of the outboard second middle land zone and the outboard shoulder land zone shown in FIG. 1.

As shown in FIG. 8, at least one of the edges, preferably each of the edges, of each of the axially inner first middle lug grooves 35 is chamfered.

The chamfer 23$d$ is preferably has a width W7$d$ and a depth (not shown) which are respectively set in the same ranges as those for the width W7A (shown in FIG. 3) and depth D7$a$ (shown in FIG. 5) of the chamfer 23$a$ of the inboard first center lug groove 11. Such chamfer 23$d$ can improve the running performance on snowy roads similarly to the chamfer 23$a$ of the inboard first center lug groove 11 shown in FIG. 5, Preferably, the width W7$d$ and the depth (not shown) of the chamfer 23$d$ are gradually decreased from the outboard second crown main groove 3B toward the outboard tread edge.

Such chamfer 23$d$ can prevent the decrease in the rigidity of the outboard second middle land zone 7B on its outboard tread edge side, therefore, it can maintain the running performance on dry roads.

At least one of the edges, preferably each of the edges, of each of the axially outer second middle lug grooves 36 is provided with a chamfer 23$e$.

Preferably, a width W7$e$ and a depth (not shown) of the chamfer 23$e$ are respectively set in the same ranges as those for the width W7A (shown in FIG. 3) and the depth D7$a$ (shown in FIG. 5) of the chamfer 23$a$ of the inboard first center lug groove 11. Preferably, the width W7$e$ and the depth of the chamfer 23$e$ are gradually decreased from the outboard second shoulder main groove 4B toward the inboard tread edge.

Such chamfer 23$e$ can improve the running performance on snowy roads.

The outboard second middle land zone 7B in this embodiment is provided with third middle sipes 31$c$.

As shown in FIG. 1. each of the third middle sipes 31$c$ extends from one of the axially inner first middle lug grooves 35 to the axially outer second middle lug groove 36 which is next to the axially outer second middle lug groove 36 adjacent to the concerned axially inner first middle lug groove 35.

As a result, with respect to the tire circumferential direction, the third middle sipes 31$c$ are inclined to the opposite direction to that of the first and second middle lug grooves 35 and 36.

Such third middle sipe 31$c$ can provide edges inclined reversely to the first middle lug groove 35 and second middle lug groove 36, to the outboard second middle land zone 7B on the outboard tread edge side, therefore, the running performance on snowy roads can be improved.

Preferably, a width (not shown) and a depth (not shown) of the third middle sipe 31$c$ are set in the same range as those for the width (not shown) and the depth (not shown) of the first middle sipe 31$a$ and the second middle sipe 31$b$.

Preferably, the angle $\alpha 8c$ (shown in FIG. 1) of the third middle sipe 31$c$ with respect to the tire circumferential direction is set in a range of from 20 to 40 degrees.

Figure 9:
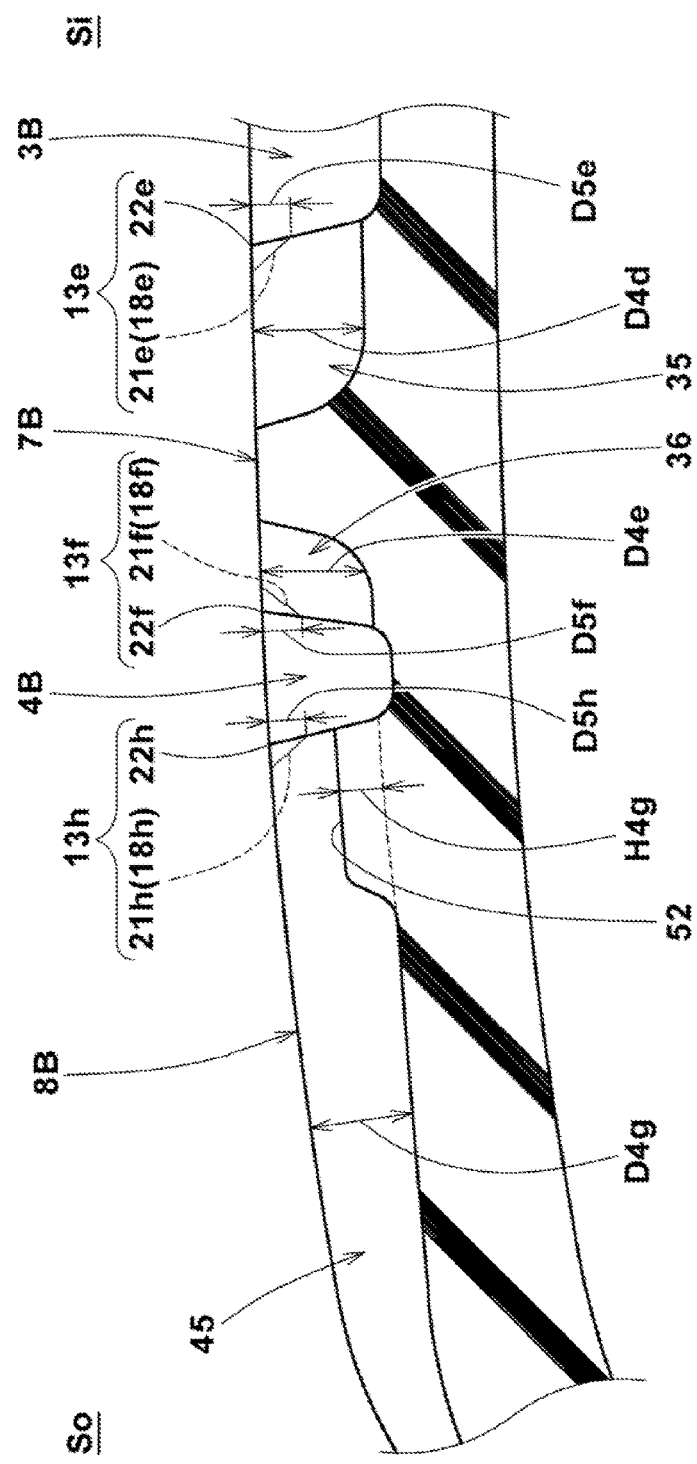
FIG. 9 is a cross sectional view taken along line A4-A4 of FIG. 8.

As shown in FIGS. 8 and 9, between every two of the circumferentially adjacent axially inner first middle lug grooves 35, a fifth corner portion 13$e$, which is formed between the ground contacting surface 2$s$ of the outboard second middle land zone 7B and the groove wall 3Bw of the outboard second crown main groove 3B, is provided with a chamfered first part 21e and a not-chamfered second part 22e which are arranged in the tire circumferential direction. The chamfer 18e of the first part 21e in this example is a flat surface.

Such first part 21e can provide a circumferential edge component to the ground contacting surface 2s of the outboard second middle land zone 7B and also to the inside of the outboard second crown main groove 3B, therefore, it can improve the running performance on snowy roads. Further, the first part 21e can partially decrease the ground contact area of the outboard second middle land zone 7B, therefore, it can improve the wet performance.

On the other hand, the second part 22c which is not chamfered, can prevent the ground contacting area and the rigidity of the outboard second middle land zone 7B from decreasing, therefore, it can exert the running performance on dry roads.

Accordingly, by the first parts 21e and the second parts 22e, the tire 1 in this embodiment can achieve both of the running performance on snowy roads and the running performance on dry roads at high levels.

Preferably, a width W5e, a depth D5e and a circumferential length L5e (the ratio to the circumferential distance L3e between the axially inner first middle lug grooves) of the first part 21e
are respectively set in the same ranges of those for
the width W5a, the depth D5a (4) and the length L5a (the ratio to the distance L3a between the inboard first center lug grooves 11) of the first part 21a between the inboard first center lug grooves 11 shown in FIG. 3.

Preferably, a circumferential length L6e of the second part 22e (the ratio to the distance L3e between the axially inner first middle lug grooves 35)
is set in the same range as that for
the length L6a (the ratio to the distance L3a between the inboard first center lug grooves 11) of the second part 22a between the inboard first center lug grooves 11 shown in FIG. 3.

One end 21es of the first part 21e reaches to one of the adjacent axially inner first middle lug grooves 35.

One end 22es of the second part 22e reaches to the other axially inner first middle lug groove 35.

Thus, the first part 21e continues to the chamfer 23d of one of the axially inner first middle lug groove 35, and provides a substantially L-shaped edge in the top view, thereby the running performance on snowy roads can be improved.

The outboard second middle land zone 7B can maintain its rigidity in the vicinity of the other axially inner first middle lug groove 35, therefore, it can maintain the running performance on dry roads.

It is preferable that, along the outboard second crown main groove 3B, the first parts 21e are arranged alternately with the first parts 21b as shown in FIG. 3. And, the second parts 22e are arranged alternately with the second parts 22b. Thus, on both sides of the outboard second crown main groove 3B, the first parts 21b and 21e are disposed evenly in the tire circumferential direction, and they can effectively improve the running performance on snowy roads and the wet performance.

On the other hand, on both sides of the outboard second crown main groove 3B, the second parts 22b and 22e are disposed evenly in the tire circumferential direction, and they can effectively exert the running performance on dry roads.

Between the adjacent first part 21e and second part 22e, a fifth step surface 25e is formed as shown in FIG. 8.

Preferably, the inclination angle (not shown) of the fifth step surface 25e with respect to the ground contacting surface 2s of the outboard second middle land zone 7B is set in the same range as that for
the angle α5a (shown in FIG. 5) of the first step surface 25a. Such fifth step surface 25e can scratch, in the tire circumferential direction, the snow on the first part 21e, while providing an axial edge component similarly to the first step surface 25a shown in FIG. 5, therefore, it can exert the running performance on snowy roads.

Preferably, the other end 21et of the first part 21e is tapered in the top view in order to avoid a stepped difference in the rigidity formed between the first part 21e and the second part 22e.

The second part 22e can be chamfered less than the first part 21e similarly to the second part 22a between the inboard first center lug grooves 11.

Such less-chamfered second part 22e can prevent the ground contact area and the rigidity of the outboard second middle land zone 7B from decreasing, while providing a circumferential edge component to the ground contacting surface 2s of the outboard second middle land zone 7B and also to the inside of the outboard second crown main groove 3B.

As shown in FIGS. 8 and 9, between every two of the adjacent axially outer second middle lug grooves 36, a sixth corner portions 13f, which is formed between the ground contacting surface 2s of the outboard second middle land zone 7B and the groove wall 4Bw of the outboard second shoulder main groove 4B, is provided with a chamfered first part 21f and a not-chamfered second part 22f which are arranged in the tire circumferential direction.

The chamfer 18f of the first part 21f in this example is a flat surface.

Such first part 21f can provide a circumferential edge component to the ground contacting surface 2s of the outboard second middle land zone 7B and to the inside of the outboard second shoulder main groove 4B, therefore, it can improve the running performance on snowy roads. Further, the first part 21f can partially decrease the ground contact area of the outboard second middle land zone 7B, therefore, it is possible to improve the wet performance.

On the other hand, the second part 22f which is not chamfered, can prevent the ground contacting area and the rigidity of the outboard second middle land zone 7B from decreasing, therefore, it can exert the running performance on dry roads.

Accordingly, by the first parts 21f and the second parts 22f, the tire 1 in this embodiment can achieve both of the running performance on snowy roads and the running performance on dry roads at high levels.

Moreover, in this embodiment, as the first parts 21e and 21f and the second parts 22e and 22f are arranged on both sides of the outboard second middle land zone 7B, it is possible to achieve both of the running performance on snowy roads and the running performance on dry roads at further high levels.

Preferably, a width W5f, a depth D5f (shown in FIG. 9) and a circumferential length L5f (the circumferential distance L3f between the axially outer second middle lug grooves 36) of the first part 21f are respectively set in the same ranges as those for the width W5a, the depth D5a (shown in FIG. 4) and the length L5a (the ratio to the distance L3a between the inboard first center lug grooves 11) of the first part 21a between the inboard first center lug grooves 11 shown in FIG. 3.

Preferably, a circumferential length L6$f$ (the ratio to the distance L3$f$ between the axially outer second middle lug grooves 36) of the second part 22$f$ is set in the same range as that for the length L6$a$ (the ratio to the distance L3$a$ between the inboard first center lug grooves 11) of the second part 22$a$ between the inboard first center lug grooves 11 shown in FIG. 3.

One end 21$fs$ of the first part 21$f$ reaches to one of the adjacent axially outer second middle lug grooves 36.

One end 22$fs$ of the second part 22$f$ reaches to the other axially outer second middle lug groove 36.

Thus, the first part 21$f$ continues to the chamfer 23$e$ of one of the axially outer second middle lug grooves 36, and can provide a substantially L-shaped edge in the top view, therefore, it can improve the running performance on snowy roads.

The outboard second middle land zone 7B can maintain its rigidity in the vicinity of the other axially outer second middle lug groove 36, and it can maintain the running performance on dry roads.

Between the adjacent first part 21$f$ and second part 22$f$, a sixth step surface 25$f$ is formed.

Preferably, the inclination angle (not shown) of the sixth step surface 25$f$ with respect to the ground contacting surface 2$s$ of the outboard second middle land zone 7B is set in the same range as that for the angle α5$a$ (shown in FIG. 5) of the first step surface 25$a$.

Such sixth step surface 25$f$ can provide an axial edge component similarly to the first step surface 25$a$ shown in FIG. 5, and can scratch, in the tire circumferential direction, the snow on the first part 21$e$, therefore, it can exert the running performance on snowy roads.

Preferably, the other end 21$ft$ of the first part 21$f$ is tapered in the top view in order to avoid a stepped difference in the rigidity formed between the first part 21$f$ and the second part 22$f$.

The second part 22$f$ can be chamfered less than the first part 21$f$ similarly to the second part 22$a$ between the inboard first center lug grooves 11.

Such less-chamfered second part 22$f$ can prevent the ground contact area and the rigidity of the outboard second middle land zone 7B from decreasing, while providing a circumferential edge component to the ground contacting surface 2$s$ of the outboard second middle land zone 7B and to the inside of the outboard second shoulder main groove 4B.

The inboard first shoulder land zone 8A is provided with inboard first shoulder lateral grooves 41 extending from the inboard first shoulder main groove 4A to the inboard tread edge 2$t$. Therefore, the inboard first shoulder land zone 8A is circumferentially divided into inboard first shoulder blocks 42.

The inboard first shoulder lateral grooves 41 are inclined with respect to the tire axial direction.

Such first shoulder lateral grooves 41 can provide both of a circumferential edge component and an axial edge component in a good balance, and it is possible to improve the running performance on snowy roads.

Further, the inboard first shoulder lateral grooves 41 can guide the water on the road surface toward the inboard first shoulder main groove 4A and the tread edge 2$t$, and can improve the wet performance.

In order to effectively derive such functions, preferably a groove width W4$f$ and a groove depth D4$f$ (shown in FIG. 2) of the inboard first shoulder lateral groove 41 are respectively set in the same ranges as those of the groove width W4$c$ and the groove depth D4$c$ (shown in FIG. 4) of the inboard first middle lateral groove 27.

Preferably, the angle α4$f$ of the inboard first shoulder lateral groove 41 with respect to the tire circumferential direction is set in a range of from 60 to 90 degrees.

The inboard first shoulder lateral grooves 41 are continuous to the inboard first middle lateral grooves 27 through the inboard first shoulder main groove 4A.

Such first middle lateral grooves 27 and first shoulder lateral grooves 41 can smoothly guide the water on the road surface from the inboard first middle land zone 7A toward the inboard tread edge 2$t$.

Further, the inboard first middle lateral grooves 27 are continuous to the inboard first center lug grooves 11 through the inboard first crown main groove 3A.

Therefore, the inboard first center lug grooves 11, the inboard first middle lateral grooves 27 and the inboard first shoulder lateral grooves 41 can guide the water on the road surface from the tire equator C side toward the inboard tread edge in succession, and can improve the wet performance.

The angle α4$a$ of the inboard first center lug grooves 11, the angle α4$c$ of the inboard first middle lateral grooves 27 and the angle α4$f$ of the inboard first shoulder lateral grooves 41 are gradually increased from the tire equator C toward the inboard tread edge.

Therefore, the inboard first center lug grooves 11, the inboard first middle lateral grooves 27 and the inboard first shoulder lateral grooves 41, can smoothly guide the water on the road surface from the tire equator C side toward the inboard tread edge 2$t$.

The inboard first shoulder lateral grooves 41 are each provided with a second tie bar 51 raising from the groove bottom surface adjacently to the inboard first shoulder main groove 4A as shown in FIGS. 1 and 7.

Preferably, the height H4$f$ of the second tie bar 51 is set in a range of from about 30% to 60% of the groove depth D4F (shown in FIG. 2) of the inboard first shoulder lateral groove 41.

The second tie bars 51 connect between the adjacent inboard first shoulder blocks 42, and thereby can increase the rigidity of the inboard first shoulder land zone 8A, therefore, the running performance on dry roads can be maintained.

As shown in FIG. 6, at least one of the edges, preferably each of the edges, of each of the inboard first shoulder lateral grooves 41 is chamfered.

The chamfer 23$f$ preferably has a width W7$f$ and a depth (not shown) which are respectively set in the same ranges as those for the width W7A (shown in FIG. 3) and the depth D7$a$ (shown in FIG. 5) of the chamfer 23$a$ of the inboard first center lug groove 11.

Such chamfer 23$f$ can improve the running performance on snowy roads similarly to the chamfer 23$a$ of the inboard first center lug groove 11 shown in FIG. 5.

The inboard first shoulder block 42 in this embodiment has an axially long rectangular shape as shown in FIG. 1, and the maximum axial width W3$d$ is larger than the maximum circumferential length L3$d$.

Preferably, the maximum axial width W3$d$ is set in a range of from 13% to about 17% of the tread width TW, and the maximum circumferential length L3$d$ is set in a range of from about 15% to 20% of the tread width TW.

Such inboard first shoulder block 42 can be relatively increased in the rigidity in the tire axial direction, therefore, the running performance on snowy roads and the running performance on dry roads can be improved.

In this embodiment, each of the inboard first shoulder blocks 42 is provided with an inboard shoulder sipe 31$d$.

The inboard shoulder sipe 31*d* extends from the inboard tread edge 2*t* toward the outboard tread edge 2*t* and terminates without reaching to the inboard first shoulder main groove 4A.

The inboard shoulder sipe 31*d* is inclined substantially parallel with the inboard first shoulder lateral grooves 41. Such inboard shoulder sipe 31*d* can provide a circumferential edge component and an axial edge component to the inboard first shoulder block 42, and can improve the running performance on snowy roads and the running performance on dry roads.

Preferably, a width (not shown) and a depth (not shown) of the inboard shoulder sipe 31*d* are respectively set in the same ranges as those for the width (not shown) and the depth (not shown) of the first middle sipe 31*a* and the second middle sipe 31*b*.

As shown in FIGS. 6 and 7, between every two of the adjacent inboard first shoulder lateral grooves 41, a seventh corner portion 13*g*, which is formed between the ground contacting surface 2S of the inboard first shoulder block 42 and the axially outer groove wall 4A*w* of the inboard first shoulder main groove 4A, is provided with a chamfered first part 21*g* and a not-chamfered second part 22*g* which are arranged in the tire circumferential direction.

The chamfer 18*g* of the first part 21*g* in this example is a flat surface.

Such first part 21*g* can provide a circumferential edge component to the ground contacting surface 2*s* of the inboard first shoulder block 42 and also to the inside of the inboard first shoulder main groove 4A, therefore, it is possible to improve the running performance on snowy roads.

Further, the first part 21*g* can partially decrease the ground contact area of the inboard first shoulder block 42, therefore, it is possible to improve the wet performance.

On the other hand, the second part 22*g* which is not been chamfered, can prevent the ground contacting area and the rigidity of the inboard first shoulder block 42 from decreasing, and it can exert the running performance on dry roads. Accordingly, by the first part 21*g* and the second part 22*g*, the tire 1 in this embodiment can achieve both of the running performance on snowy roads and the running performance on dry roads at high levels.

Preferably, a width W5*g*, a depth D5*g* (shown in FIG. 7) and a circumferential length L5*g* (the ratio to the circumferential distance L3*g* between the inboard first shoulder lateral grooves 41) of the first part 21*g*
are respectively set in the same ranges as those for
the width W5*a*, the depth D5*a* (shown in FIG. 4) and the length L5*a* (the ratio to the distance L3*a* between the inboard first center lug grooves 11) of the first part 21*a* between the inboard first center lug grooves 11 shown in FIG. 3.

Preferably, a circumferential length L6*g* (the ratio to the distance L3*g* between the inboard first shoulder lateral grooves 41) of the second part 22*g* is set in the same range as that for the length L6*a* (the ratio to the distance L3*a* between the inboard first center lug grooves 11) of the second part 22*a* between the inboard first center lug grooves 11 shown in FIG. 3.

One end 21*gs* of the first part 21*g* reaches to one of the adjacent inboard first shoulder lateral grooves 41.
One end 22*gs* of the second part 22*g* reaches to the other inboard first shoulder lateral groove 41.
Thus, the first part 21*g* continues to the chamfer 23*f* of one of the inboard first shoulder lateral grooves 41, and can provide a substantially L-shaped edge in the top view, therefore, it can improve the running performance on snowy roads.

Thereby, the inboard first shoulder block 42 can maintain its rigidity in the vicinity of the other inboard first shoulder lateral groove 41, and can maintain the running performance on dry roads.

It is preferable that, along the inboard first shoulder main groove 4A, the first parts 21*g* and the first parts 21*d* are arranged alternately or staggeredly. And the second parts 22*g* and the second part 22*d* are arranged alternately or staggeredly. Thus, on both sides of the inboard first shoulder main groove 4A, the first parts 21*d* and 21*g* are disposed evenly in the tire circumferential direction, which can effectively improve the running performance on snowy roads and the wet performance. Further, on both sides of the inboard first shoulder main groove 4A, the second parts 22*d* and 22*g* are disposed evenly in the tire circumferential direction, which can effectively exert the running performance on dry roads.

Between the adjacent first part 21*g* and second part 22*g*, a seventh step surface 25*g* is formed.

Preferably, the inclination angle (not shown) of the seventh step surface 25*g* with respect to the ground contacting surface 2*s* of the inboard first shoulder block 42 is set in the same range as that for the angle α5*a* of the first step surface 25*a*. Such seventh step surface 25*g* can scratch, in the tire circumferential direction, the snow on the first part 21*g*, while providing an axial edge component similarly to the first step surface 25*a* shown in FIG. 5, therefore, it can exert the running performance on snowy roads.

Preferably, the other end 21*gt* of the first part 21*g* is tapered in the top view in order to avoid a stepped difference in the rigidity formed between the first part 21*g* and the second part 22*g*.

The second part 22*g* can be chamfered less than the first part 21*g* similarly to the second part 22*a* between the inboard first center lug grooves 11.

Such less-chamfered second part 22*g* can prevent the ground contact area and the rigidity of the inboard first shoulder block 42 from decreasing, while providing a circumferential edge component to the ground contacting surface 2S of the inboard first shoulder block 42 and to the inside of the inboard first shoulder main groove 4A.

The outboard second shoulder land zone 8B is provided with outboard shoulder lateral grooves 45 extending from the outboard second shoulder main groove 4B to the tread edge 2*t* as shown in FIG. 1, and thereby the outboard second shoulder land zone 8B is circumferentially divided into second shoulder blocks 46.

The outboard shoulder lateral grooves 45 can be parallel with the tire axial direction or slightly inclined with respect to the tire axial direction.

Such outboard shoulder lateral groove 45 can provide mainly an axial edge component, therefore, it is possible to improve the running performance on snowy roads.

Further, the outboard shoulder lateral grooves 45 can guide the water on the road surface toward the outboard second shoulder main groove 4B and the tread edge 2*t*, therefore, the wet performance can be improved.

In order to effectively derive such functions, it is preferred that a groove width W4*g* and a groove depth D4*g* (shown in FIG. 2) of the outboard shoulder lateral grooves 45 are respectively set in the same ranges as those for the groove width W4*c* and the groove depth D4*c* of the inboard first middle lateral grooves 27.

Preferably, the angle α4g of the outboard shoulder lateral groove 45 with respect to the tire circumferential direction is set in a range of from 70 to 90 degrees.

The outboard shoulder lateral grooves 45 are continuous to the axially outer second middle lug grooved 36 through the outboard second shoulder main groove 4B.
Such axially outer second middle lug grooves 36 and outboard shoulder lateral grooves 45, can smoothly guide the water on the road surface from the outboard second middle land zone 7B toward the outboard tread edge, therefore, the wet performance can be improved.

The angle α4e of the axially outer second middle lug groove 36 and the angle α4g of the outboard shoulder lateral groove 45 are gradually increased from the outboard second middle land zone 7A toward the outboard tread edge. Therefore, the second middle lug grooves 36 and the outboard shoulder lateral grooves 45 can smoothly guide the water on the road surface from the outboard second middle land zone 7B toward the outboard tread edge.

The outboard shoulder lateral grooves 45 are each provided with a third tie bar 52 raising from the groove bottom adjacently to the outboard second shoulder main groove 4B as shown in FIGS. 1 and 9.
Preferably, the height H4g of the third tie bar 52 is set in a range of from about 30% to 60% of the groove depth D4g (shown in FIG. 2) of the inboard first shoulder lateral groove 41.
Such third tie bars 52 connect between the adjacent second shoulder blocks 46 and increase the rigidity of the outboard second shoulder land zone 8B, therefore, the running performance on dry roads can be maintained.

As shown in FIG. 8, at least one of the edges, preferably each of the edges, of each of the outboard shoulder lateral grooves 45 is chamfered.
The chamfer 23g preferably has a width W7g and a depth (not shown) which are respectively set in the same ranges as those for the width W7a and the depth D7a (shown in FIG. 5) of the chamfer 23a of the inboard first center lug grooves 11.
Such chamfer 23g can improve the running performance on snowy roads similarly to the chamfer 23a of the inboard first center lug groove 11 shown in FIG. 5.

In this embodiment, as shown in FIG. 1, the second shoulder block 46 has an axially long rectangular shape, and the maximum axial width W3e is larger than the maximum circumferential length L3e.
Preferably, the maximum width W3e and the maximum length L3e are respectively set in the same ranges as those for the maximum axial width W3d and the maximum circumferential length L3d of the inboard first shoulder block 42.
Such second shoulder block 46 can be relatively increased in the rigidity in the tire axial direction, and thereby it is possible to improve the running performance on snowy roads and the running performance on dry roads.

The second shoulder blocks 46 in this embodiment are each provided with a second shoulder sipe 31e.
The second shoulder sipe 31e extends from the outboard tread edge 2t toward the outboard second shoulder main groove 4B and terminates without reaching thereto.
The second shoulder sipe 31e is inclined substantially parallel with the outboard shoulder lateral grooves 45.
Such second shoulder sipe 31e of the second shoulder block 46 can provide a circumferential edge component and an axial edge component, and can improve the running performance on snowy roads and the running performance on dry roads.

Preferably, a width (not shown) and a depth (not shown) of the second shoulder sipe 31e are respectively set in the same ranges as those for the width (not shown) and the depth (not shown) of the first middle sipe 31a and the second middle sipe 31b.

As shown in FIGS. 8 and 9, in each of the second shoulder blocks 46, a eighth corner portion 13h, which is formed between the ground contacting surface 2s of the second shoulder block 46 and the axially outer groove wall 4Bw of the outboard second shoulder main groove 4B, is provided with a chamfered first part 21h and a not-chamfered second part 22h which are arranged in the tire circumferential direction.
The chamfer 18h of the first part 21h in this example is a flat surface.
Such first part 21h can provide a circumferential edge component to the ground contacting surface 2s of the second shoulder block 46 and to the inside of the outboard second shoulder main groove 4B, therefore, it is possible to improve the running performance on snowy roads.
Further, the first part 21h can partially decrease the ground contact area of the second shoulder block 46, therefore, it can improve the wet performance.
On the other hand, the second part 22h which is not chamfered, can prevent the ground contacting area and the rigidity of the second shoulder block 46 from decreasing, therefore, it can exert the running performance on dry roads.
Accordingly, by the first part 21h and the second part 22h, the tire 1 in this embodiment can achieve both of the running performance on snowy roads and the running performance on dry roads at high levels.

Preferably, a width W5h, a depth D5h (shown in FIG. 9) and a circumferential length L5h (the ratio to the circumferential distance L3h between the outboard shoulder lateral grooves 45) of the first part 21h
are respectively set in the same ranges as those for
the width W5a, the depth D5a (shown in FIG. 4) and the length L5a (the ratio to the distance L3a between the inboard first center lug grooves 11) of the first part 21a between the inboard first center lug grooves 11 shown in FIG. 3.

Preferably, a circumferential length L6g (the ratio to the distance L3h between the outboard shoulder lateral grooves 45) of the second part 22g is set in the same range as that for the circumferential length L6a (the ratio to the distance L3a between the inboard first center lug grooves 11) of the second part 22a between the inboard first center lug grooves 11 shown in FIG. 3.

One end 21hs of the first part 21h reaches to one of the adjacent outboard shoulder lateral grooves 45.
One end 22hs of the second part 22h reaches to the other outboard shoulder lateral groove 45.
Thus, the first part 21h continues to the chamfer 23g of one of the outboard shoulder lateral grooves 45, and provide a substantially L-shaped edge in the top view, which can improve the running performance on snowy roads.
The second shoulder block 46 can maintain its rigidity in the vicinity of the other outboard shoulder lateral groove 45, and can maintain the running performance on dry roads.

It is preferable that the first parts 21h and the first parts 21f between the axially outer second middle lug grooves 36 are arranged alternately or staggeredly along the outboard second shoulder main groove 4B. And the second parts 22h and the second parts 22f between the axially outer second middle lug grooves 36 are arranged alternately or staggeredly along the outboard second shoulder main groove 4B.
Thus, on both sides of the outboard second shoulder main groove 4B, the first parts 21f and 21h are disposed evenly in the tire circumferential direction, which can effectively improve the running performance on snowy roads and the wet performance. Further, on both sides of the outboard second shoulder main groove 4B, the second parts 22f and 22h are disposed evenly in the tire circumferential direction, which can effectively exert the running performance on dry roads.

Between the adjacent first part 21h and second part 22h, a eighth step surface 25h is formed.

Preferably, the inclination angle (not shown) of the eighth step surface 25h with respect to the ground contacting surface 2S of the second shoulder block 46 is set in the same range as that for the angle α5a (shown in FIG. 5) of the first step surface 25a.

Such eighth step face 25h can provide an axial edge component similarly to in the first step surface 25a shown in FIG. 5, and can scratch, in the tire circumferential direction, the snow on the first part 21h, therefore, it can exert the running performance on snowy roads.

Preferably, the other end 21ht of the first part 21h is tapered in the top view in order to avoid a stepped difference in the rigidity formed between the first part 21h and the second part 22h.

The second part 22h can be chamfered less than the first part 21h similarly to the second part 22a between the inboard first center lug grooves 11.

Such less-chamfered second part 22h can prevent the ground contact area and the rigidity of the second shoulder block 46 from decreasing, while providing a circumferential edge component to the ground contacting surface 2s of the second shoulder block 46 and to the inside of the outboard second shoulder main groove 4B.

Figure 10A:
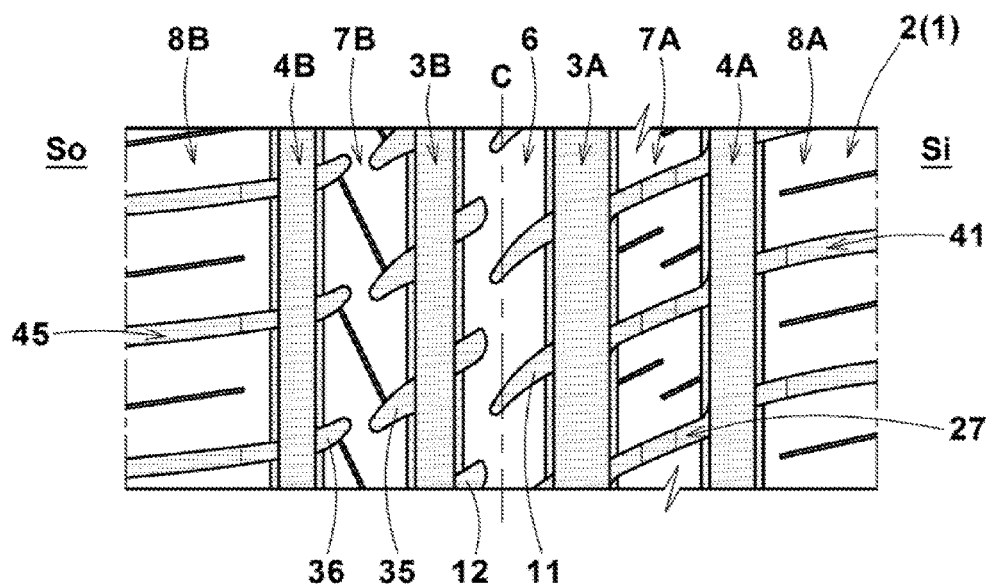
FIG. 10($a$) is a developed view of a tread portion of a tire as Comparative Example 1, FIG. 10($b$) is a developed view of a tread portion of a tire as Comparative Example 2.
Figure 10B:
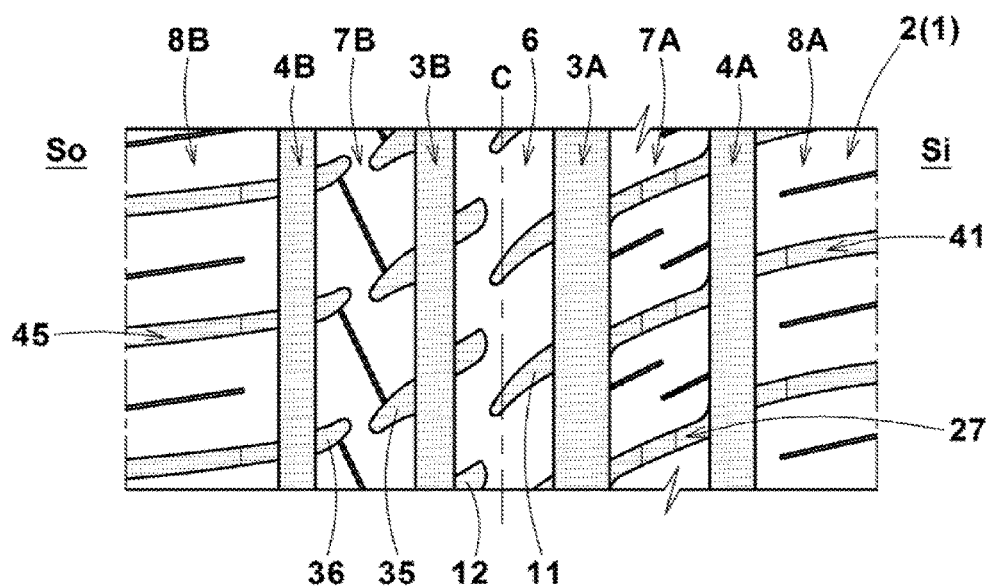

While detailed description has been made of an especially preferable embodiment of the present invention, the present invention can be embodied in various forms without being limited to the illustrated embodiment Working Examples Based on the tread pattern shown in FIG. 1, test tires as working examples 1 to 16 were manufactured and their performances were evaluated. For comparison,
a test tire as Comparative Example 1 provided with chamfers extending continuously between adjacent lug grooves and chamfers extending continuously between adjacent transverse grooves as shown in FIG. 10(a), and
a test tire as comparative example 2 provided with no chamfers between adjacent lug grooves and between adjacent transverse grooves as shown in FIG. 10(b)
were prepared and, their performances were evaluated. The specifications of the first parts, the second parts and the chamfers of the test tires are shown in Table 1, In Table 1, although the dimensions relating to only the first part of the first corner portion between the inboard first center lug grooves are listed, the first parts of the second to eighth corner portions were also formed in the same dimensions. Common specifications are as follows.
Tire size: 225/40 ZR18
Rim size: 18×8 J
Tire pressure: 240 kPa
Test vehicle: All-wheel-drive vehicle (2000 cc displacement)
Tread width TW: 178 mm
inboard first crown main groove:
    groove width W1a/TW: 7.5%
    groove depth D1a: 8.5 mm
outboard second crown main groove:
    groove width W1b/Tw: 5.2%
    groove depth D1b: 8.5 mm
inboard first shoulder main grooves:
    groove width W2a/Tw: 6.0%
    groove depth D2a: 8.3 mm
outboard second shoulder main grooves:
    groove width W2b/TW: 5.2%
    groove depth D2b: 8.3 mm
ratio between second middle lug groove length L4e and first middle lug groove length L4d: 75%
Test methods are as follows.
<Running Performance on Dry Roads>
The test vehicle provided on all wheels with test tires was run on a dry asphalt road of a test course, and the test driver evaluated characteristics relating to steering response, rigidity feeling, grip, etc.
The results are indicated in Table 1 by an index based on comparative Example 2 being 100, wherein the larger value is better, and values under 75 are not desirable.
<Running Performance on Snow-Covered Roads>
The test vehicle was run on a snow-covered road (not compacted-snow) of a test course, and the test driver evaluated characteristics relating to handle response, rigidity feeling, grip, etc.
The results are indicated in Table 1 by an index based on Comparative Example 2 being 100, wherein the larger value is better.
<Wet Performance>
By applying the brake during the test vehicle was running at a speed of 65 km/h on a wet asphalt road surface covered with a water film of 0.5 to 2.0 mm thickness, the slowing-down distance from 60 km/h to 20 km/h was measured.
Using inverse numbers of the measurement values, the results are indicated in Table 1 by an index based on Comparative Example 2 being 100, wherein the larger value is better.

TABLE 1

| Tire | Comparative Example 1 | Comparative Example 2 | Working Example 1 | Working Example 2 | Working Example 3 | Working Example 4 | Working Example 5 | Working Example 6 | Working Example 7 |
|---|---|---|---|---|---|---|---|---|---|
| tread pattern (Fig. No.) | 10(a) | 10(b) | 1 | 1 | 1 | 1 | 1 | 1 | 1 |
| first and second parts | — | absent | present | present | present | present | present | present | present |
| chamfer | absent | absent | absent | present | present | present | present | present | present |
| first part width W5a (mm) | 2.0 | — | 2.0 | 2.0 | 1.0 | 2.0 | 1.0 | 2.0 | 2.0 |
| first part depth D5a/first crown main groove depth D1a (%) | 50 | — | 50 | 50 | 50 | 40 | 40 | 50 | 50 |
| chamfer width W7a (mm) | 2.0 | — | — | 2.0 | 2.0 | 2.0 | 2.0 | 1.0 | 3.0 |
| chamfer depth D7a/first crown main groove depth D1a (%) | 50 | — | — | 50 | 50 | 50 | 50 | 50 | 50 |

TABLE 1-continued

|  | | | | | | | | | |
|---|---|---|---|---|---|---|---|---|---|
| ratio of second center lug groove length L4b/ first center lug groove length L4a (%) | 100 | 100 | 100 | 100 | 100 | 100 | 100 | 100 | 100 |
| driving performance on dry roads | 80 | 100 | 98 | 94 | 98 | 96 | 96 | 96 | 92 |
| driving performance on snowy roads | 110 | 100 | 105 | 110 | 105 | 105 | 103 | 105 | 115 |
| wet performance | 105 | 100 | 103 | 105 | 103 | 105 | 103 | 102 | 110 |

| Tire | Working Example 8 | Working Example 9 | Working Example 10 | Working Example 11 | Working Example 12 | Working Example 13 | Working Example 14 | Working Example 15 | Working Example 16 |
|---|---|---|---|---|---|---|---|---|---|
| tread pattern (Fig. No.) | 1 | 1 | 1 | 1 | 1 | 1 | 1 | 1 | 1 |
| first and second parts chamfer | present | present | present | present | present | present | present | present | present |
|  | present | present | present | present | present | present | present | present | present |
| first part width W5a (mm) | 2.0 | 2.0 | 2.0 | 2.0 | 2.0 | 2.0 | 2.0 | 2.0 | 2.0 |
| first part depth D5a/ first crown main groove depth D1a (%) | 50 | 50 | 50 | 50 | 50 | 50 | 40 | 40 | 50 |
| chamfer width W7a (mm) | 2.0 | 2.0 | 3.0 | 2.0 | 2.0 | 2.0 | 2.0 | 2.0 | 2.0 |
| chamfer depth D7a/ first crown main groove depth D1a (%) | 40 | 60 | 60 | 50 | 50 | 50 | 50 | 60 | 60 |
| ratio of second center lug groove length L4b/ first center lug groove length L4a (%) | 100 | 100 | 100 | 25 | 54 | 400 | 54 | 54 | 54 |
| driving performance on dry roads | 98 | 92 | 90 | 96 | 103 | 92 | 105 | 100 | 98 |
| driving performance on snowy roads | 105 | 115 | 116 | 110 | 110 | 110 | 105 | 108 | 110 |
| wet performance | 105 | 110 | 113 | 105 | 105 | 105 | 105 | 108 | 108 |

From the test results, it was confirmed that, as compared with Comparative examples, working examples could achieve both of the running performance on snowy roads and the running performance on dry roads, and could be improved in the wet performance.

REFERENCE SIGNS LIST 1 tire
2 tread portion
3A inboard first crown main groove
3B outboard second crown main groove
6 center land zone
11 center lug groove
13a first corner portion
21a first part
22a second part

The invention claimed is:

1. A tire comprising a tread portion provided with
a first crown main groove continuous in the tire circumferential direction,
a second crown main groove continuous in the tire circumferential direction, and
a center land zone defined therebetween,
the center land zone provided with first center lug grooves extending from the first crown main groove and terminating within the center land zone and arranged in the tire circumferential direction,
wherein
between the first center lug grooves adjacent to each other in the tire circumferential direction, a first corner portion, which is formed between a ground contacting surface of the center land zone and a groove wall of the first crown main groove, is provided with a first part and a second part which are arranged in the tire circumferential direction,
the first part is chamfered,
the second part is not chamfered or less chamfered than the first part,
the center land zone is provided with second center lug grooves extending from the second crown main groove and terminating within the center land zone and arranged in the tire circumferential direction,
between the second center lug grooves adjacent to each other in the tire circumferential direction, a second corner portion, which is formed between the ground contacting surface of the center land zone and a groove wall of the second crown main groove, is provided with a first part and a second part which are arranged in the tire circumferential direction, wherein the first part of the second corner portion is chamfered, and the second part of the second corner portion is not chamfered or less chamfered than the first part of the second corner portion,
the position of the tread portion relative to a vehicle is specified such that, when the tire is mounted on the vehicle,
the first center lug grooves are located inside of the vehicle and the second center lug grooves are located outside of the vehicle, and
the axial length of the second center lug grooves is smaller than the axial length of the first center lug grooves.

2. The tire according to claim 1, wherein
one end of said first part between the first center lug grooves reaches to one of the first center lug grooves.

3. The tire cording to claim 1, wherein
one end of said second part between the first center lug grooves reaches to one of the first center lug grooves.

4. The tire according to claim 1, wherein
one end of said first part between the first center lug grooves reaches to one of the first center lug grooves, and
one end of said second part between the first center lug grooves reaches to the other first center lug groove.

5. The tire according to claim 1, wherein
at least one of the edges of each said first center lug groove is chamfered.

6. The tire according to claim 1, wherein
the first center lug grooves and the second center lug grooves are inclined in the same direction, and arranged alternately in the tire circumferential direction.

7. The tire according to claim 1, wherein
the first center lug grooves and the second center lug grooves are inclined in the same direction at 30 to 50 degrees with respect to the tire circumferential direction, and arranged alternately in the tire circumferential direction.

8. The tire according to claim 1, wherein
the first center lug groove extends in an arcuate shape, and the second center lug groove extends linearly.

9. The tire according to claim 2, wherein
at least one of the edges of each said first center lug groove is chamfered.

10. The tire according to claim 3, wherein
at least one of the edges of each said first center lug groove is chamfered.

11. The tire according to claim 4, wherein
at least one of the edges of each said first center lug groove is chamfered.

12. A tire comprising a tread portion provided with
a first crown main groove continuous in the tire circumferential direction,
a second crown main groove continuous in the tire circumferential direction, and
a center land zone defined therebetween,
the center land zone provided with first center lug grooves extending from the first crown main groove and terminating within the center land zone and arranged in the tire circumferential direction,
wherein:
between the first center lug grooves adjacent to each other in the tire circumferential direction, a first corner portion, which is formed between a ground contacting surface of the center land zone and a groove wall of the first crown main groove, is provided with a first part and a second part which are arranged in the tire circumferential direction, wherein the first part is chamfered, and the second part is not chamfered or less chamfered than the first part,
the tread portion is provided with
a first shoulder main groove disposed between the first crown main groove and the adjacent tread edge and extending continuously in the tire circumferential direction, and
a middle land zone defined between the first shoulder main groove and the first crown main groove,
the first middle land zone is provided with first middle lateral grooves extending from the first crown main groove to the first shoulder main groove, and
the first middle lateral grooves are continuous to the first center lug grooves through the first crown main groove.

13. The tire according to claim 12, wherein
the tread portion is provided with a first shoulder land zone defined between the first shoulder main groove and the adjacent tread edge,
the first shoulder land zone is provided with first shoulder lateral grooves extending from the first shoulder main groove to the tread edge, and
the first middle lateral grooves are continuous to the first shoulder lateral grooves through the first shoulder main groove.

14. The tire according to claim 13, wherein
the position of the tread portion relative to a vehicle is specified, and
the first crown main groove, the first shoulder main grooves, the first middle land zone, the first shoulder land zone, the first center lug grooves, the first middle lateral grooves, and the first shoulder lateral grooves are located on one side of the tire equator which side is inside on the vehicle when the tire is mounted on the vehicle.

15. A tire comprising a tread portion provided with
a first crown main groove continuous in the tire circumferential direction,
a second crown main groove continuous in the tire circumferential direction, and
a center land zone defined therebetween,
the center land zone provided with first center lug grooves extending from the first crown main groove and terminating within the center land zone and arranged in the tire circumferential direction,
wherein:
between the first center lug grooves adjacent to each other in the tire circumferential direction, a first corner portion, which is formed between a ground contacting surface of the center land zone and a groove wall of the first crown main groove, is provided with a first part and a second part which are arranged in the tire circumferential direction, wherein the first part is chamfered, and the second part is not chamfered or less chamfered than the first part,
the tread portion is provided with
a second shoulder main groove disposed between the second crown main groove and the adjacent tread edge and extending continuously in the tire circumferential direction, and
a second middle land zone defined between the second crown main groove and the second shoulder main groove,
the center land zone is provided with second center lug grooves extending from the second crown main groove and terminating within the center land zone and arranged in the tire circumferential direction,
the second middle land zone is provided with first middle lug grooves extending from the second crown main groove toward the second shoulder main groove and terminating within the second middle land zone and arranged in the tire circumferential direction, and
the second center lug grooves are continuous to the first middle lug groove through the second crown main groove,
the second middle land zone is provided with
second middle lug grooves extending from the second shoulder main groove toward the second crown main groove and terminating within the second middle land zone, and
middle sipes extending between the first middle lug grooves and the second middle lug grooves.

16. The tire according to claim 15, wherein
the position of the tread portion relative to a vehicle is specified such that, when the tire is mounted on the vehicle,
the first center lug grooves are located inside of the vehicle and the second center lug grooves are located outside of the vehicle, and
the first center lug groove extends in an arcuate shape, and the second center lug groove extends linearly.

17. The tire according to claim 15, wherein
the position of the tread portion relative to a vehicle is specified, and
the second crown main groove, the second shoulder main grooves, the second middle land zone, the shoulder land zone, the second center lug grooves, the first middle lug grooves, the second middle lug grooves, the middle sipes are located on one side of the tire equator which side is outside of the vehicle when the tire is mounted on the vehicle.

* * * * *